(12) United States Patent
Klottrup et al.

(10) Patent No.: US 8,417,011 B2
(45) Date of Patent: Apr. 9, 2013

(54) COLONY DETECTION

(75) Inventors: Kerensa Klottrup, Hampshire (GB);
Christopher Mann, Hampshire (GB);
Aaron Figg, Hampshire (GB); Julian Francis Burke, Hampshire (GB)

(73) Assignee: Molecular Devices (New Milton) Ltd. (GB)

( * ) Notice: Subject to any disclaimer, the term of this patent is extended or adjusted under 35 U.S.C. 154(b) by 749 days.

(21) Appl. No.: 12/560,201

(22) Filed: Sep. 15, 2009

(65) Prior Publication Data
US 2010/0074507 A1 Mar. 25, 2010

Related U.S. Application Data

(60) Provisional application No. 61/098,180, filed on Sep. 18, 2008.

(51) Int. Cl.
*G06K 9/00* (2006.01)
(52) U.S. Cl. .......................................... 382/133
(58) Field of Classification Search .................. 382/133
See application file for complete search history.

(56) References Cited

U.S. PATENT DOCUMENTS

| | | | |
|---|---|---|---|
| 4,376,110 A | 3/1983 | David et al. | |
| 5,415,839 A * | 5/1995 | Zaun et al. | 422/64 |
| 2004/0137611 A1* | 7/2004 | Miesenbock et al. | 435/320.1 |
| 2004/0229245 A1* | 11/2004 | Bittner et al. | 435/6 |
| 2005/0032127 A1* | 2/2005 | Marx et al. | 435/7.2 |
| 2005/0182242 A1* | 8/2005 | Snyder et al. | 530/350 |
| 2005/0207633 A1 | 9/2005 | Arini et al. | |
| 2006/0177878 A1* | 8/2006 | Richmond et al. | 435/7.2 |
| 2007/0037220 A1* | 2/2007 | Burke et al. | 435/7.2 |

FOREIGN PATENT DOCUMENTS

| | | |
|---|---|---|
| EP | 0239400 A2 | 9/1987 |
| EP | 0368684 A1 | 5/1990 |
| EP | 0623679 B1 | 11/1994 |
| EP | 0436597 | 7/1997 |
| EP | 1752771 A1 | 2/2007 |
| WO | WO 90/02809 A1 | 3/1990 |
| WO | WO 90/07861 A1 | 7/1990 |
| WO | WO 03/072699 A2 | 9/2003 |

OTHER PUBLICATIONS

Madan Babu Mohan, Resume as updated on May 2, 2011 showing #19, "Introduction to Microarray Data Analysis" in 2004.*
M. Madan Babu "Chapter 11, An Introduction to Microarray Data Analysis" 2004.*
Jones, "Recent Advances in Antibody Development" BioProces Technology Consultants 2007.*

(Continued)

*Primary Examiner* — Neal Sereboff
(74) *Attorney, Agent, or Firm* — James R. Abney; Bella Fishman

(57) ABSTRACT

The present invention provides in one aspect a method for determining a production level of a polypeptide of interest by a cell or cell colony, comprising obtaining an image of one or more cells or cell colonies; and analyzing the image to detect a signal associated with the polypeptide of interest; wherein a signal level is determined for each cell or cell colony based on signal values from a predefined area surrounding the cell or cell colony, the signal level being indicative of the production level of the polypeptide of interest by the cell or cell colony.

37 Claims, 15 Drawing Sheets

OTHER PUBLICATIONS

Browne et al. "Selection methods for hight-producing mammalian cell lines" Trends in Biotechnology, vol. 25 No. 9, Jul. 30, 2007.*
Lee et al., "High-Throughput Screening of Cell Lines Expresing Monoclonal Antibodies" Cell Line Engineering BioProcess International May 2006.*
Genetix, "Stemand iPS cell selection: quantitation of surface maker (SSEA1) and intracellular GFP" 2007 Nature Publishing Group.*
Fox, Sophia "Solutions for Cell-Focused Applications" Genetic Engineering and Biotechnology News Mar. 15, 2006 (vol. 26., No. 6).*
Nakai et al., "Migration of nerve growth cones requires detergent-resistant membranes in a spatially defined and substrate-dependent manner" JCB vol. 159, No. 6 Dec. 23, 2002.*
Jones, Susan "Recent Advances in Antibody Development" BioProcess Technology Consultants BIO2007.*
Dempsey et al., "High Throughput Process Development Technologies: Promises, Myths, and Truths" Jul. 2008.*
Genetix "Rapid automated selection of mammalian cell colonies by cell surface protein expression" 2007 Nature Publishing Group.*
Altmann, F. et al., "Insect cells as hosts for the expression of recombinant glycoproteins," *Glycoconj. J.*, 1999, vol. 16, pp. 109-123.
Cormack B.P. et al., "FACS—optimized mutants of the green fluorescent protein (GFP)," *Gene*, 1996, vol. 173, pp. 33-38.
Davis J.M. et al., "A simple, single-step technique for selecting and cloning hybridomas for the production of monoclonal antibodies," *J. Immunol. Methods*, 1982, vol. 50, pp. 161-171.
Goding J.W., "Antibody production by hybridomas," *J. Immunol. Methods*, 1980, vol. 39, No. 4, pp. 285-308.
Haas J. et al., "Codon usage limitation in the expression of HIV-1 envelope glycoprotein," *Curr. Biol.*, 1996, vol. 6, pp. 315-324.
Kohler and Milstein, "Continuous cultures of fused cells secreting antibody of predefined specificity," *Nature*, 1975, vol. 256, pp. 495-497.
Kost and Condreay, "Recombinant baculoviruses as expression vectors for insect and mammalian cells," *Current Opinion in Biotechnology*, 1999, vol. 10, pp. 428-433.
Ormö, M. et al., "Crystal Structure of the *Aequorea victoria* Green Fluorescent Protein," Science, 1996, vol. 273, pp. 1392-1395.
Riechmann, L. et al., "Reshaping human antibodies for therapy," *Nature*, 1988, vol. 322, pp. 323-327.
Sharon J. et al., "Detection of specific hybridoma clones by replica immunoadsorption of their secreted antibodies," *Proc. Natl. Acad. Sci. USA*, 1979, vol. 76, No. 3, pp. 1420-1424.
Yang T.T. et al., "Optimized codon usage and chromophore mutations provide enhanced sensitivity with green fluorescent protein," *Nucleic Acids Res.*, 1996, vol. 24, No. 22, pp. 4592-4593.

* cited by examiner

COLONY DETECTION

CROSS-REFERENCES TO RELATED APPLICATIONS

This application claims the benefit under 35 USC 119(e) of U.S. Provisional Application No. 61/098,180, filed Sep. 18, 2008.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

FIELD

The present invention relates to identifying cells or cell colonies which are highly productive for a polypeptide of interest, for instance during the selection of cultured cell colonies using an automated picking apparatus.

BACKGROUND OF THE INVENTION

Many molecular biology techniques depend on cloning individual cells from a mixture of cells.

For example, in the production of monoclonal antibodies, an essential step is hybridoma selection, including the separation and culture of individual hybridoma clones (fused myelomas and primary mouse cells). After cell fusion, the traditional way of selecting for monoclonality is to plate out single cells into 96-well dishes. This is repeated until clonality is assured.

Similarly, understanding gene function and identification of pharmaceutical leads requires the establishment of cell lines containing transfected genes expressed at an appropriate level. Standard techniques require the co-transfection of a gene with a dominant selectable marker followed by selection for growth for example in an antibiotic such as G418 or hygromycin. The resulting colonies are then picked by hand and further analysed for gene expression (RT-PCR) and functional expression.

Ascertaining optimal conditions for cell growth and differentiation requires broad testing of growth factors and culture conditions. The evaluation of a particular treatment requires a statistical approach on a large number of individual cells. One way to achieve this is to use numerous culture dishes, several for each treatment.

This process of cloning out may be modified and automated through the use of robots. Thus, for example, the ClonePix robot (manufactured by Genetix) implements this process by picking individual colonies directly from standard semi-solid media, the media preventing migration of the dividing cells. Thus, an imaging head captures images of colonies growing in the medium under white light, and software routines allow the separation and detection of individual colonies. A picking head then picks individual colonies into a 96-well plate.

Using a robot implemented picking method, colonies can be picked into 96-well plates at a picking speed of up to 400 clones per hour and graphic software allows the user to select colonies on the basis of size, shape, brightness and proximity. Furthermore, the software allows stratification of clones into slow, medium and fast growing cells, and clones of the same class may be grouped in the same 96-well plate. This gives rise to considerable savings in subsequent tissue culture steps as all wells can be processed at the same time.

When selecting cell colonies, it is desirable to identify those which are most productive for the polypeptide of interest. The robot implemented cloning method may identify and select cell colonies based on visualisation of colony size. Thus, the image capture system provides information on the size of the colony, and all colonies within a certain size range are picked. Effectively this system assumes that productivity of the desired polypeptide is directly related to size of the colony.

However this assumption is not necessarily correct. It is known for example that different hybridoma clones are capable of producing varying amounts of antibody, regardless of colony size. When selecting colonies based purely on colony size, no direct information is provided or processed as to the productivity of different cells (i.e., the quantity of product produced or secreted). Thus this system cannot discriminate between a high-producing hybridoma cell or colony and a low-producing hybridoma cell or colony if they are of a similar size. With regard to transfected cells, the robot cannot distinguish between clones with different levels of expression and/or secretion of recombinant protein.

A method disclosed in EP1752771 addresses this issue by identifying cells producing a polypeptide of interest using a combination of a class marker and a specificity marker. Marker-polypeptide complexes can then be detected, for example by an automated imaging system, and cells producing a high level of the polypeptide picked directly by a robot.

Cell or colonies producing a polypeptide of interest can also be selected by the use of dominant selectable marker. A gene for the marker may be transfected into cells together with a gene for the polypeptide of interest, followed by amplification of the marker gene. The marker is typically an enzyme, and amplification of the marker gene may occur in increasing concentrations of an inhibitor of the enzyme. The most commonly used system for such co-amplification uses dihydrofolate reductase (DHFR) as the enzyme. DHFR can be inhibited by the drug methotrexate (MTX). To achieve co-amplification, a host cell (which may lack an active gene which encodes DHFR) is transfected with a vector which comprises DNA sequences encoding DHFR and a desired protein. The genes for DHFR and desired protein may also be co-transfected into the cell on different vectors. The transfected host cells are cultured in media containing increasing levels of MTX, and those cell lines which survive are selected.

In a further method, productive colonies may be identified by binding a marker to a reference polypeptide whose expression is linked to the polypeptide of interest. For instance, the reference polypeptide may be an amplifiable selectable marker such as DHFR and the marker may be a labelled molecule which binds to the marker (e.g. methotrexate for DHFR). The cell colonies may be imaged to identify labelled cells in which the marker is amplified. These colonies are also expected to produce the polypeptide of interest at a high level.

In some of the above methods, productive colonies may be identified by imaging of a signal associated with the polypeptide of interest. The signal may be derived from a marker (e.g. an antibody or inhibitor) which binds directly to the polypeptide of interest, or which binds to another molecular species which is indicative of the level of the polypeptide of interest in the cell. Typically the signal is a fluorescent signal (e.g. from a fluorescently-labelled antibody or inhibitor).

However, in these methods there is still a problem of how to correlate the signal associated with the marker with the most productive colonies. In particular, it is not apparent how image data should be interpreted in order to allocate signal values to a particular colony in the most efficient manner. Moreover, it is not clear whether the colonies which produce the polypeptide of interest at the highest level are simply those which are associated with the highest signal.

Therefore there is still a need for an improved method for identifying a cell or cell colony, which allows the most productive cells or colonies to be identified from image data of the type discussed above.

BRIEF SUMMARY OF THE INVENTION

Accordingly, in one aspect the present invention provides a method for determining a production level of a polypeptide of interest by a cell or cell colony, comprising obtaining an image of one or more cells or cell colonies and analyzing the image to detect a signal associated with the polypeptide of interest, wherein a signal level is determined for each cell or cell colony based on signal values from a predefined area surrounding the cell or cell colony, the signal level being indicative of the production level of the polypeptide of interest by the cell or cell colony.

The predefined area may be any shape but is typically based on a circle centred on the cell or cell colony in the image. The size of the predefined area may be, for example, a multiple of a mean cell or colony size. For example, the predefined area may be a circle of radius or diameter 2-5 times (e.g. 2, 3, 4 or 5 times) a mean cell or colony radius or diameter. In specific embodiments, the circle has a diameter of 0.1 to 10 mm (for instance for a cell colony of diameter 0.05 to 2 mm), or the circle has a diameter of 1 to 500 μm (for instance for a cell of diameter 0.5 to 100 μm). Specific examples of a numerical value of the predefined area may range from 0.008 to 80 mm$^2$ for a cell colony or 0.8 to 200,000 μm$^2$ for a cell. These size values relate to the actual size of the predefined area in the sample containing the cells. Clearly the size of the predefined area as represented in the image is likely to be different to the actual size considering the degree of magnification used in producing the image.

By "predefined" it is meant that the basic dimensions of the area to be applied generally to every cell or colony are selected or set (automatically or by a user) prior to analysis (i.e. prior to the calculation of the signal level). A predefined area defined by these same basic dimensions is positioned around each cell or colony and the signal level therein is determined. However, as described below, the shape of the predefined area may vary in relation to each individual cell or colony by virtue of the exclusion of particular regions (e.g. corresponding to the cell or colony itself or other (neighbouring) cells or colonies).

In one embodiment, the signal level is calculated as a mean of signal values in the predetermined area in the image. The mean may be an arithmetic or geometric mean. In another embodiment, the signal level is calculated as a median of signal values in the predetermined area. In an alternative embodiment, the signal level is calculated as a sum of signal values in the predetermined area.

In a preferred embodiment, the predefined area excludes the cell or cell colony itself, i.e. the predefined area covers a region external to and surrounding the cell or cell colony but not an internal region corresponding to an area covered by the cell or cell colony. In this embodiment, the shape of the internal region excluded from the predefined area may correspond substantially to the shape of cell or cell colony itself, i.e. the internal region may be an irregular-shaped area excluded from the predefined area. For example the shape of the cell or cell colony may be determined by the imaging system and excluded from the predetermined area. Alternatively, the internal region may be a regularly shaped area which corresponds to an approximation of the area covered by the cell or cell colony. For instance the internal region may be a circle covering the same total area as the area covered by the cell or colony, and centred over the centre of the cell or colony. In this embodiment, the predetermined area may be substantially annular in shape.

In an alternative embodiment, the predefined area includes the cell or colony itself, i.e. the predefined area covers both an internal region (corresponding to the cell or cell colony) and an external region (exterior to and surrounding the cell).

In another embodiment, the predefined area excludes one or more further regions corresponding to further cells or cell colonies. For instance, the predefined area may exclude regions covered by neighbouring cells or colonies (which would otherwise fall within the predefined area). The further excluded regions may be of regular or irregular shape as described above for the exclusion of the internal region corresponding to the cell or colony itself. For instance, the boundaries of the further excluded regions may be determined by the imaging system.

Preferably the polypeptide of interest is a secreted polypeptide, i.e. the polypeptide of interest is secreted by the cell or cell colony. In an alternative embodiment, the polypeptide of interest is an intracellular or membrane-bound polypeptide, e.g. a polypeptide typically found in the cytoplasm or nucleus of a cell.

In a further embodiment, the invention comprises a method for selecting a cell or cell colony which produces a polypeptide of interest, comprises determining a production level of the polypeptide of interest by a plurality of cells or cell colonies by a method as defined above, and selecting a cell or cell colony which produces the polypeptide of interest at an elevated level.

In one embodiment of the selection method, the cell or cell colony may be selected based on an elevated level of production of the polypeptide of interest compared to other cells or cell colonies tested. For instance, the method may involve selecting the most productive cell or cell colony, or a number of cells or colonies having above average productivity, for instance the 1%, 10%, 30% or 50% of most productive cells.

In one embodiment, the cells or colonies are selected based on comparison to a predetermined level of the polypeptide of interest, for instance based on a cut-off level of the signal value.

In further embodiments, cells or colonies are selected based on one or more further criteria. For instance, in one embodiment, a minimum and/or maximum colony size criterion may be applied. This means that a colony is only selected if it is within a defined size range, for instance if it is above a minimum size or below a maximum size. Examples of a size range for colony selection are 0.01 to 0.5 mm$^2$, e.g. 0.05 to 0.1 mm$^2$.

Preferably the signal is a fluorescent signal. In one embodiment, the cells are contacted with a marker compound, for instance a fluorescently-labelled marker, before imaging. The marker compound may, for example, bind to the polypeptide of interest or to another species which is indicative of the level of the polypeptide of interest.

In one embodiment, boundaries of the cells or cell colonies are determined under visible (white) light. In this embodiment, the signal from the predetermined area is preferably a fluorescent signal.

The signal may be measured, for example, by an automated imaging apparatus. The imaging apparatus may produce an image based on intensity values of the signal at a plurality of pixels making up the image. For instance, each signal value may correspond to an intensity value from a single pixel in the image. A single pixel may represent the signal from a single detector in the imaging apparatus, e.g. a single detector in a charge coupled device (CCD) device or camera in the apparatus. Thus the predefined area may be defined in terms of a number of pixels and the signal level may be defined as a mean, median or total pixel intensity value for the predefined area. In certain embodiments a background intensity level may be subtracted from the obtained pixel values before calculating the signal level.

In some embodiments, signal levels at two or more different wavelengths may be determined. For instance, signal values from a first wavelength may be derived from a fluorescent signal from a label in a marker compound. These signal values, or a signal level calculated therefrom, may be divided by signal values or a signal level from a second wavelength. Ratioing the signals using a second wavelength may provide an indication of background signal levels or allow a correction of the signal values from the first wavelength, in order to provide a more accurate reflection of the production level of the polypeptide of interest. Thus cells or cell colonies may be selected and picked based on a ratio of signal levels or values at two different wavelengths. A cut-off or threshold value of this ratio may be used to determine whether to select a particular cell or colony.

In a further aspect, the present invention provides an automated imaging apparatus for determining a production level of a polypeptide of interest by a cell or cell colony, wherein the apparatus is configured to obtain an image of one or more cells or cell colonies; and analyze the image to detect a signal associated with the polypeptide of interest; wherein the apparatus is configured to determine a signal level for each cell or cell colony based on signal values from a predefined area surrounding the cell or cell colony, the signal level being indicative of the production level of the polypeptide of interest by the cell or cell colony.

In one embodiment, the automated imaging apparatus comprises a fluorescent imaging device such as a fluorescent microscope. The automated imaging apparatus may further comprise, for example an image acquisition device such as a camera, e.g. a CCD device. The apparatus may further comprise a processor, for example for processing the acquired image to determine the signal level.

In a further aspect the present invention provides an automated cell picking device which is configured to perform the present methods. In one embodiment, the automated cell picking device comprises an automated imaging apparatus as described above, and a cell picking head. The cell picking device may be configured to pick a cell or cell colony identified by the imaging apparatus, e.g. a cell or colony which has been identified as producing the polypeptide of interest at an elevated level.

In a further aspect, the present invention provides a computer program, residing on a computer-readable medium, for controlling automated image acquisition and analysis, the computer program comprising instructions for causing an apparatus (e.g. an imaging and/or cell picking apparatus) to obtain an image of one or more cells or cell colonies; and analyze the image to detect a signal associated with a polypeptide of interest, by determining a signal level for each cell or cell colony based on signal values from a predefined area surrounding the cell or cell colony, the signal level being indicative of the production level of the polypeptide of interest by the cell or cell colony.

The computer program may further comprise instructions for causing the apparatus to pick one or more cells or cell colonies based on the indicated production level.

Embodiments of the present invention advantageously allow the identification of highly productive cells or cell colonies, for instance from within a population of such cells or colonies.

DETAILED DESCRIPTION OF THE INVENTION

Figure 1:
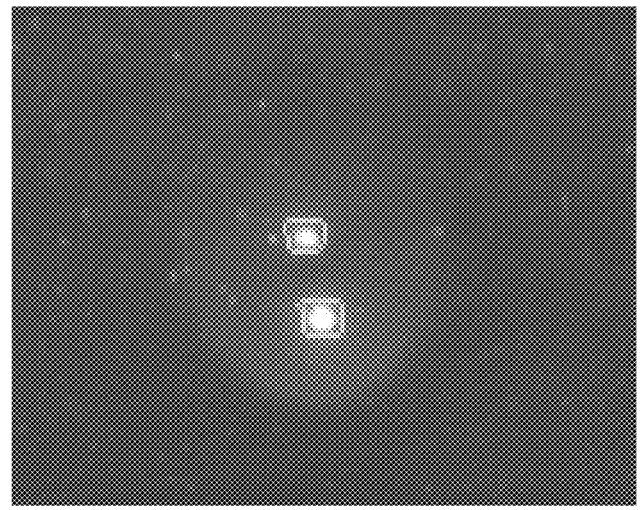
FIG. 1 shows a white light image obtained using an automated imaging apparatus of two adjacent cell colonies.

The present invention provides a method of detecting a cell or colony which produces a polypeptide of interest at a high level. Colonies or cells of interest may then be selected and picked for further study.

In preferred embodiments, any of the steps set out in relation to the detection method, such as exposing the cells to a marker compound, detection of binding, image capture and analysis, as well as associated steps such as selection and/or picking of cells or colonies of interest may be conducted using automated robotic apparatus. In preferred embodiments, the robotic apparatus comprises a ClonePix FL apparatus (Genetix, New Milton, United Kingdom).

In preferred embodiments, the cells are grown on the surface of or within solid or semi-solid media. Thus, preferably, the cell or colony may be grown on agar, agarose, or methylcellulose media. In preferred embodiments, the cells or colonies are grown on a Petri dish or other similar container, although it will be appreciated that other containers may also be used, such as well plates, particularly 1 well plates, 4 well plates, 6 well plates, microtitre dishes, etc.

The cell or colony of cells may comprise any cultured cell or cell line, as known in the art. Included are prokaryotic cells and eukaryotic cells, including bacteria, yeast, insect and mammalian cells. A list of known cell lines is set out in the Cell Line Data Base (Istituto Nazionale per la Ricerca sul Cancro, Genova, Italy) and the ECACC European Collection of Cell Cultures. Specific examples of cells include *E. coli* cells, CHO cells, HeLa cells, African green monkey cells, Sf9 cells, etc. Such cells may be transfected with suitable expression vectors to enable expression of polypeptides, as described in further detail below. Other cells particularly suitable for use in the methods described here are fused cell lines, including hybridoma cell lines.

In general, when referring to "a cell" herein, unless otherwise stated it is intended to include more than one cell, a plurality of cells, or any collection of cells, e.g. a cell colony. Thus the method may comprise determining a production level of the polypeptide of interest by individual cells or by individual cell colonies. The method can therefore be applied to picking cell colonies as well as to identifying individual cells which express a polypeptide of interest at a high level.

Specifically, the method described herein enables colonies or cells of interest, e.g., which produce polypeptides of interest at a high level, to be identified. Advantageously, the colonies are visualised and imaged, and identified by software according to specific characteristics of a signal emitted by the colonies. Other characteristics, such as size, may also be used for identifying relevant colonies or cells. Selected colonies or cells may then be picked and replated, for example into 96 well plates, for growing on, using for example a ClonePix FL robotic apparatus (Genetix, New Milton, United Kingdom).

The invention enables the determination of a production level of a polypeptide of interest by a cell or colony. Thus, the methods described here enable the selection of high producing colonies. The method may be applied to a number of cells or colonies, preferably a plurality of cells or colonies, simultaneously.

Polypeptide of Interest

The polypeptide of interest may be, for example, an intracellular polypeptide, a membrane polypeptide or a secreted polypeptide. In one embodiment, the polypeptide of interest is a secreted polypeptide, e.g. a secreted antibody such as IgG. The secreted polypeptide may form a halo or aura around the cell or colony which produces it. Embodiments of the present invention advantageously allow the identification of cells or colonies which produce a secreted polypeptide at a high level by quantifying a signal associated with the polypeptide within a predefined area surrounding the cell. Determining average signal values associated with this predefined area outside the cell or colony is a better predictor of productivity than other determinations of signal values associated with a cell or colony.

Preferably the polypeptide of interest is a biotherapeutic molecule, for instance a therapeutic antibody, growth factor, cytokine or other recombinant polypeptide expressed by the cell. In one embodiment, the polypeptide of interest is a recombinant polypeptide expressed by a host cell, i.e. the cell has been engineered to express the polypeptide of interest. In an alternative embodiment, the polypeptide of interest is produced naturally by the cell, i.e. the polypeptide of interest is a non-recombinant product.

Exemplary polypeptides of interest include antibodies, peptibodies, immunoglobulin-like proteins, non-antibody proteins and non-immunoglobulin-like proteins, particularly biotherapeutic molecules in these classes. Such polypeptides include those with modified glycosylation, polypeptides without glycosylation (unglycosylated). As used herein, "analogs" refers to an amino acid sequence that has insertions, deletions or substitutions relative to the parent sequence, while still substantially maintaining the biological activity of the parent sequence, as determined using biological assays known to one of skill in the art. Polypeptides of interest also include derivatives of naturally occurring or analog polypeptides which have been chemically modified, for example, to attach water soluble polymers (e.g., pegylated), radionuclides, or other diagnostic or targeting or therapeutic moieties.

Exemplary polypeptides of interest include human erythropoietin, darbepoetin, granulocyte-colony stimulating factor (GCSF), stem cell factor, leptin, hormones, cytokines, hematopoietic factors, growth factors, antiobesity factors, trophic factors, anti-inflammatory factors, receptors or soluble receptors, enzymes, variants, derivatives, or analogs of any of these proteins. Other examples include insulin, gastrin, prolactin, adrenocorticotropic hormone (ACTH), thyroid stimulating hormone (TSH), luteinizing hormone (LH), follicle stimulating hormone (FSH), human chorionic gonadotropin (HCG), motilin, interferons (alpha, beta, gamma), interleukins (IL-1 to IL-12), tumor necrosis factor (TNF), tumor necrosis factor-binding protein (TNF-bp), brain derived neurotrophic factor (BDNF), glial derived neurotrophic factor (GDNF), neurotrophic factor 3 (NT3), fibroblast growth factors (FGF), neurotrophic growth factor (NGF), bone growth factors such as osteoprotegerin (OPG), insulin-like growth factors (IGFs), macrophage colony stimulating factor (M-CSF), granulocyte macrophage colony stimulating factor (GM-CSF), megakaryocyte derived growth factor (MGDF), keratinocyte growth factor (KGF), thrombopoietin, platelet-derived growth factor (PGDF), colony simulating growth factors (CSFs), bone morphogenetic protein (BMP), superoxide dismutase (SOD), tissue plasminogen activator (TPA), urokinase, streptokinase, or kallikrein, receptors or soluble receptors, enzymes, variants, derivatives, or analogs of any of these proteins.

In one embodiment, the polypeptide of interest comprises an antibody or immunoglobulin. Thus one aspect of the invention provides a method of determining a production level of a polypeptide of interest comprising an antibody or immunoglobulin produced by a cell or cell colony. The cell or cell colony may therefore comprise an antibody producing cell, preferably an antibody secreting cell, such as a B-cell, transfected myeloma or a hybridoma.

As used herein, the term "antibody" includes fully assembled antibodies, monoclonal antibodies (including human, humanized or chimeric antibodies), multispecific antibodies (e.g., bispecific antibodies), Maxibody, and antibody fragments that can bind antigen (e.g., Fab', F'(ab)2, Fv, single chain antibodies, diabodies), comprising complementarity determining regions (CDRs) of the foregoing as long as they exhibit the desired biological activity.

Exemplary antibodies are Herceptin® (Trastuzumab), a recombinant DNA-derived humanized monoclonal antibody that selectively binds to the extracellular domain of the human epidermal growth factor receptor 2 (Her2) proto-oncogene; Rituxan® (Rituximab), a genetically engineered chimeric murine/human monoclonal antibody directed against the CD20 antigen found on the surface of normal and malignant B lymphocytes; Avastin® (bevacizumab), Bexxar® (Tositumomab), Campath® (Alemtuzumab), Erbitux® (Cetuximab), Humira® (Adalimumab), Raptiva® (efalizumab), Remicade® (Infliximab), ReoPro® (Abciximab), Simulect® (Basiliximab), Synagis® (Palivizumab), Xolair® (Omalizumab), Zenapax® (Daclizumab), Zevalin® (Ibritumomab Tiuxetan), or Mylotarg® (gemtuzumab ozogamicin), receptors or soluble receptors, enzymes, variants, derivatives, or analogs of any of these antibodies.

In one embodiment, the polypeptide of interest comprises a receptor polypeptide. A receptor, as the term is used in this document, means any polypeptide which is capable of binding another molecule, preferably a small molecule such as a ligand. Preferably, a receptor is a protein molecule that receives and responds to a specific neurotransmitter, hormone, ligand or other substance. Preferably, the receptor is capable of binding an affinity ligand of the receptor.

Where the polypeptide comprises a receptor, the cell or cell colony may be a cultured cell which has been engineered to express the receptor, preferably as a recombinant protein. The cell which is transfected may be any suitable cell as known in the art, for example, suspension adapted adherent cells such as CHO-S are suitable.

The cell may be transfected with an expression vector encoding a receptor polypeptide. The receptor preferably comprises a trans-membrane receptor, and may be a peripheral membrane receptor, a transmembrane protein receptor or an intracellular receptor, such as a nuclear receptor.

The receptor may comprise a G protein-coupled receptor (GPCR), also known as a seven transmembrane receptor or 7TM receptor. For example, the receptor may comprise any of the following (ligands in brackets following): a "muscarinic" acetylcholine receptor (acetylcholine and muscarine), an adenosine receptor (adenosine), an adrenoceptor or adrenergic receptor (ligand: adrenaline, and other structurally related hormones and drugs), a GABA receptor, type-b (γ-aminobutyric acid or GABA), an angiotensin receptor (angiotensin), a cannabinoid receptor (cannabinoids), a cholecystokinin receptor (cholecystokinin), a dopamine receptor (dopamine), a glucagon receptor (glucagon), a histamine receptor (histamine), a olfactory receptor, a opioid receptor (opioids), a rhodopsin (a photoreceptor), a secretin receptor (secretin), a serotonin receptors (Serotonin, also known as 5-Hydroxytryptamine or 5-HT) or a somatostatin receptor (Somatostatin).

The receptor may comprise a tyrosine kinase receptor, such as an erythropoietin receptor (Erythropoietin), an insulin receptor (Insulin), a growth factor receptor or a cytokine receptor. The receptor may comprise a guanylyl cyclase receptor such as GC-A & GC-B, comprising receptors for Atrial-natriuretic peptide (ANP) and other natriuretic peptides or GC-C, a guanylin receptor.

The receptor may comprise an ionotropic receptor, for example a nicotinic acetylcholine receptor (Acetylcholine, Nicotine), a glycine receptor (GlyR) (Glycine, Strychnine), a GABA receptor: GABA-A, GABA-C (GABA), a glutamate receptor, an NMDA receptor, an AMPA receptor, a kainate receptor (Glutamate) or a 5-HT3 receptor (Serotonin).

Marker Compound

In some embodiments, the method of the invention involves a step of exposing the cells to an agent or marker compound which associates with the polypeptide of interest. The agent which associates with the polypeptide of interest may be, for example, a ligand or antibody which selectively binds to the polypeptide of interest. Alternatively, the cells may be exposed to a marker compound which binds to a reference polypeptide, the level of the reference polypeptide in the cell being indicative of the level of the polypeptide of interest.

By "a marker compound which associates with a polypeptide of interest" it is meant that levels of the marker compound can be correlated with levels of the polypeptide of interest. For instance, the marker compound may bind (directly) to the polypeptide of interest.

In further embodiments, the marker compound may bind to a further compound, the level of which is indicative of the level of the polypeptide of interest, i.e. there is an indirect association between the marker compound and the polypeptide of interest. In other words, the marker compound is associated with the polypeptide of interest but does not bind directly to it. For example, the marker compound may indirectly provide an indication of expression of the polypeptide of interest by the cell by binding to a further compound, the level of which can be correlated with that of the polypeptide of interest. In one embodiment, the polypeptide of interest is an enzyme and the marker compound binds to a substrate or product of the enzyme. Cells which express and secrete the polypeptide of interest may show elevated levels of the enzyme product (e.g. in an area surrounding the cell) and consequently elevated levels of binding of the marker compound.

Uses of Detection Method

The detection method may be used for picking a cell or cell colony which produces a polypeptide of interest, by assessing the amount of a polypeptide of interest produced by the cell or cell colony and picking that cell or cell colony. It will also be clear that the detection method may be used to assess the productivity of a cell or colony in producing a protein of interest, for example a hybridoma cell or cell colony in producing an antibody of interest. The productivity which is determined may be compared to a predetermined cut off point, and only those cells or colonies which meet or exceed that target may be chosen. Thus, the detection method may be employed in a method of selecting a productive cell or cell colony from a plurality of cells or cell colonies.

Label/Reporter/Signal

The marker compound is capable of being detected, preferably by emitting a signal. For this purpose, the marker compound may be labelled with a reporter molecule. A "signal", as used here, is any detectable event. The signal may be the generation of an enzymatic activity, such as protease activity, transcriptional activity or luminescence inducing activity. Preferably, however, the signal is emission or absorption of electromagnetic radiation, for example, light.

Fluorescent Label

In highly preferred embodiments, the signal is a fluorescent signal. Included are fluorescence, phosphorescence or other signals which involve the modulation of the intensity or frequency of emission or absorption of radiation, for example, a FRET signal (described in further detail below).

Preferably, the fluorescent signal is emitted from a fluorophore such as a fluorescent protein or fluorescent chemical. Thus, marker compound may comprise a reporter molecule comprising a fluorophore such as a fluorescent protein or fluorescent chemical.

Examples of fluorescent chemicals include allophycocyanine, phycocyanine, phycoerythrin, rhodamine, tetramethyl rhodamine, 7-nitro-benzofurazan rhodamine isothiocyanate, oxazine, coumarin, fluorescein derivatives, for example, FAM (6-carboxy-fluorescein), TET (6-carboxy-4,7,2',7'-tetrachloro-fluorescein), (FITC) fluorescein isothiocyanate and carboxyfluorescein diacetate, as well as Texas Red, acridine yellow/orange, ethidium bromide, propidium iodide and bisbenzamide (commercially available from Hoechst under the trade name H33258).

Preferred fluorescent chemicals are fluorescein isothiocyanate, rhodamine and phycoerythrin, and preferred fluorescent proteins are Green Fluorescent Protein, Blue Fluorescent Protein, Cyan Fluorescent Protein, Yellow Fluorescent Protein and Red Fluorescent Protein. The fluorescent signal may be modulated by fluorescent resonance energy transfer (FRET).

Methods of conjugating fluorescent labels to various entities, including peptides, polypeptides and antibodies, are well known in the art.

The fluorescent signal may be emitted from a fluorescent polypeptide. Thus, the marker compound may comprise a reporter molecule comprising a fluorescent polypeptide.

Examples of fluorescent polypeptides and proteins include Green Fluorescent Protein (GFP) from *Aequorea victoria* and Red Fluorescent Protein (RFP) from *Discosoma* spp. Derivatives and variants of these proteins, such as Cyan Fluorescent Protein, Blue Fluorescent Protein, Enhanced Green Fluorescent Protein (EGFP; GFPmut1; Yang, T. T., et al. (1996) Nucleic Acids Res. 24(22):4592-4593; Cormack, B. P., et al. (1996) Gene 173:33-38.), Enhanced Blue Fluorescent Protein (EBFP), Enhanced Yellow Fluorescent Protein (EYFP; Ormö, et al. (1996) Science 273:1392-1395), Destabilised Enhanced Green Fluorescent Protein (d2EGFP; Living Colors Destabilized EGFP Vectors (April 1998) CLONTECHniques XIII(2):16-17), Enhanced Cyan Fluorescent Protein (ECFP), and GFPuv (Haas, J., et al. (1996) Curr. Biol. 6:315-324) may also be used. These fluorescent proteins are available from CLONTECH Laboratories, Inc. (Palo Alto, Calif., USA).

The signal may be a luminescence inducing activity. It will be appreciated that as light is generated during luminescence, the signal may at the same time be a luminescence inducing activity and emission of electromagnetic radiation.

The signal may also be the generation of an enzymatic activity. The marker compound may therefore comprise a polypeptide with an assayable enzyme activity.

The reporter may be attached, coupled, fused, mixed, combined, or otherwise joined to the marker compound. The attachment, etc between the reporter and the marker may be permanent or transient, and may involve covalent or non-covalent interactions (including hydrogen bonding, ionic interactions, hydrophobic forces, Van der Waals interactions, etc).

In preferred embodiments, the reporter is permanently, preferably covalently attached to the marker compound. In such preferred embodiments, the reporter is chemically coupled or cross-linked to the marker compound. Any of the various methods of chemical coupling which are known in the art may be employed for this purpose.

In certain embodiments, it may be desirable to include spacing means between the reporter and the marker compound. Such spacing means may suitably comprise linkers or spacers as known in the art. The purpose of the spacing means is to space the reporter and the marker, to avoid for example steric hindrance and to promote detection of the reporter and hence the marker. Accordingly, depending on the application, the use of shorter or longer spacers may be preferred.

The spacing means may comprise linkers or spacers which are polymers of differing lengths (the length of which may be controlled by controlling the degree of polymerisation). Numerous spacers and linkers are known in the art, and the skilled person will know how to choose and use these, depending on the application. The skilled person will also know what spacer length to use.

The spacers may be made for example of polyethylenglycol, PEG derivatives or polyalkanes or homo poly amino acids. Dextrans and dendrimers, as known in the art, may also be used. In particular, the linkers or spacers may comprise nucleotide polymers (nucleic acids, polynucleotides, etc) or amino acid polymers (proteins, peptides, polypeptides, etc).

Solid or Semi-Solid Media

In preferred embodiments, the cells are grown on the surface of or within solid or semi-solid media.

Growth of cells, particularly antibody secreting hybridomas, on such media enhances secretion, as described in Goding, J. W. 1980. Antibody production by hybridomas. [Review]. J. Immunol. Methods. 39(4): 285-308, Sharon, J., Morrison, S. L. and Kabat, E. A. 1979. Detection of specific hybridoma clones by replica immunoadsorption of their secreted antibodies. Proc. Natl. Acad. Sci. (USA). 76(3): 1420-4 and Davis, J. M., Pennington, J. E., Kubler, A.-M. and Conscience, J. F. 1982. A simple, single-step technique for selecting and cloning hybridomas for the production of monoclonal antibodies. J. Immunol. Methods. 50: 161-171.

Methylcellulose media may, for example, be obtained from Sigma-Aldrich Company Ltd (Dorset, UK) under catalogue number M0387 (Methyl cellulose viscosity 1,500 cP (2% aqueous solution, 20° C.) (lit.) CAS Number 9004-67-5) or catalogue number M0512 (Methyl cellulose viscosity 4,000 cP (2% aqueous solution, 20° C.) (lit.) CAS Number 9004-67-5).

In highly preferred embodiments, the polypeptide of interest is secreted from a cell or colony of cells grown on the surface of or within methylcellulose media. The use of methylcellulose media is well known in the art, and protocols have been established to enable hybridoma cloning on such media. See for example, the ClonaCell™-HY Hybridoma Cloning Kit Procedure Manual (StemCell Technologies, Vancouver, Canada), herein incorporated by reference.

The media may optionally comprise growth factors or other supplements optimized to support the selection and growth of the relevant cells. Where solid or semi-solid media are employed, in one embodiment the marker compound is included in the media to allow binding to take place. Alternatively the marker compound may be incubated with the cells before they are plated and overlaid with the solid or semi-solid media.

In some embodiments, the polypeptide of interest may be secreted into the medium such that it surrounds the cell or colony to form a halo or aura. Thus, the halo or aura in general terms comprises a concentration of polypeptide in the immediate environs of the cell or colony.

Haloes or auras are particularly pronounced so where the cell or colony is growing on the surface of or within a solid or semi-solid medium. The halo or aura arises through the fact that diffusion of the secreted polypeptide away from the cell or colony producing it is restricted.

In embodiments of the present invention, a signal arising from the halo or aura may be detected within the predefined area surrounding each cell or colony. The signal may be, for example, a visible light signal or detection may be promoted by reaction with the marker compound. For example, where the marker compound is labelled with a signal generating reporter, the halo or aura may take the form of an area of signal surrounding the cell or colony within the predefined area. In particular embodiments, the label is a fluorescence label and the aura or halo comprises an area of fluorescence. Formation of such a halo or aura allows the detection of secreted polypeptide to be more easily detected.

The halo or aura within the predefined area may preferably be detected by a visualisation system in a robotic picking apparatus, for example.

Antibodies

In certain embodiments, the polypeptide of interest may be an antibody. Moreover, the marker compound may be an antibody which binds to the polypeptide of interest.

Antibodies comprise immunoglobulin molecules. Immunoglobulin molecules are in the broadest sense members of the immunoglobulin superfamily, a family of polypeptides comprising the immunoglobulin fold characteristic of antibody molecules, which contains two β sheets and, usually, a conserved disulphide bond. Members of the immunoglobulin superfamily are involved in many aspects of cellular and non-cellular interactions in vivo, including widespread roles in the immune system (for example, antibodies, T-cell receptor molecules and the like), involvement in cell adhesion (for example the ICAM molecules) and intracellular signalling (for example, receptor molecules, such as the PDGF receptor). The methods described here may therefore make use of any immunoglobulin superfamily molecule which is capable of binding to a target molecule. Peptides or fragments derived from immunoglobulins may also be used.

Antibodies, as used herein, refers to complete antibodies or antibody fragments capable of binding to a selected target, and including Fv, ScFv, F(ab') and F(ab')$_2$, monoclonal and polyclonal antibodies, engineered antibodies including chimeric, CDR-grafted and humanised antibodies, and artificially selected antibodies produced using phage display or alternative techniques. Small fragments, such as Fv and ScFv, possess advantageous properties for diagnostic and therapeutic applications on account of their small size and consequent superior tissue distribution. Preferably, the antibody is a single chain antibody or ScFv.

The antibodies may be altered antibodies comprising an effector protein such as a toxin or a label. Use of labelled antibodies allows the imaging of the distribution of the antibody in vivo. Such labels may be radioactive labels or radioopaque labels, such as metal particles, which are readily visualisable within the body of a patient. Moreover, they may be fluorescent labels (such as the ones described here) or other labels which are visualisable on tissue samples removed from patients. Antibodies with effector groups may be linked to any association means as described above.

Antibodies to be used as marker compounds may be obtained from animal serum, or, in the case of monoclonal antibodies or fragments thereof, produced in cell culture. Recombinant DNA technology may be used to produce the antibodies according to established procedure, in bacterial, yeast, insect or preferably mammalian cell culture. The selected cell culture system preferably secretes the antibody product.

Growing of hybridoma cells or mammalian host cells in vitro is carried out in suitable culture media, which are the customary standard culture media, for example Dulbecco's Modified Eagle Medium (DMEM) or RPMI 1640 medium, optionally replenished by a mammalian serum, for example foetal calf serum, or trace elements and growth sustaining supplements, for example feeder cells such as normal mouse peritoneal exudate cells, spleen cells, bone marrow macrophages, 2-aminoethanol, insulin, transferrin, low density lipoprotein, oleic acid, or the like. The culture medium may be serum-free or animal-produce free, such as a chemically defined medium, in order to minimise animal derived contamination. Multiplication of host cells which are bacterial cells or yeast cells is likewise carried out in suitable culture media known in the art, for example for bacteria in medium LB, NZCYM, NZYM, NZM, Terrific Broth, SOB, SOC, 2×YT, or M9 Minimal Medium, and for yeast in medium YPD, YEPD, Minimal Medium, or Complete Minimal Dropout Medium.

Use of insect cells as hosts for the expression of proteins has advantages in that the cloning and expression process is relatively easy and quick. In addition, there is a high probability of obtaining a correctly folded and biologically active protein when compared to bacterial or yeast expression. Insect cells may be cultured in serum free medium, which is cheaper and safer compared to serum containing medium. Recombinant baculovirus may be used as an expression vector, and the construct used to transfect a host cell line, which may be any of a number of lepidopteran cell lines, in particular *Spodoptera frugiperda* Sf9, as known in the art. Reviews of expression of recombinant proteins in insect host cells are provided by Altmann et al. (1999), *Glycoconj J* 1999, 16, 109-23 and Kost and Condreay (1999), *Curr Opin Biotechnol*, 10, 428-33.

In vitro production provides relatively pure antibody preparations and allows scale-up to give large amounts of the desired antibodies. Techniques for bacterial cell, yeast, insect and mammalian cell cultivation are known in the art and include homogeneous suspension culture, for example in an airlift reactor or in a continuous stirrer reactor, or immobilised or entrapped cell culture, for example in hollow fibres, microcapsules, on agarose microbeads or ceramic cartridges.

Large quantities of the desired antibodies can also be obtained by multiplying mammalian cells in vivo. For this purpose, hybridoma cells producing the desired antibodies are injected into histocompatible mammals to cause growth of antibody-producing tumours. Optionally, the animals are primed with a hydrocarbon, especially mineral oils such as pristane (tetramethyl-pentadecane), prior to the injection. After one to three weeks, the antibodies are isolated from the body fluids of those mammals. For example, hybridoma cells obtained by fusion of suitable myeloma cells with antibody-producing spleen cells from Balb/c mice, or transfected cells derived from hybridoma cell line Sp2/0 that produce the desired antibodies are injected intraperitoneally into Balb/c mice optionally pre-treated with pristane, and, after one to two weeks, ascitic fluid is taken from the animals.

The foregoing, and other, techniques are discussed in, for example, Kohler and Milstein, (1975) Nature 256:495-497; U.S. Pat. No. 4,376,110; Harlow and Lane, Antibodies: a Laboratory Manual, (1988) Cold Spring Harbor, incorporated herein by reference. Techniques for the preparation of recombinant antibody molecules is described in the above references and also in, for example, EP 0623679; EP 0368684 and EP 0436597, which are incorporated herein by reference.

The cell culture supernatants are screened for the desired antibodies, preferentially by immunofluorescent staining of cells expressing the desired target by immunoblotting, by an enzyme immunoassay, for example a sandwich assay or a dot-assay, or a radioimmunoassay.

For isolation of the antibodies, the immunoglobulins in the culture supernatants or in the ascitic fluid may be concentrated, for example by precipitation with ammonium sulphate, dialysis against hygroscopic material such as polyethylene glycol, filtration through selective membranes, or the like. If necessary and/or desired, the antibodies are purified by the customary chromatography methods, for example gel filtration, ion-exchange chromatography, chromatography over DEAE-cellulose and/or immunoaffinity chromatography, for example affinity chromatography with the a protein containing a target or with Protein-A.

Antibodies generated according to the foregoing procedures may be cloned by isolation of nucleic acid from cells, according to standard procedures. Usefully, nucleic acids variable domains of the antibodies may be isolated and used to construct antibody fragments, such as scFv.

The methods described here preferably employ recombinant nucleic acids comprising an insert coding for a heavy chain variable domain and/or for a light chain variable domain of antibodies. By definition such nucleic acids comprise coding single stranded nucleic acids, double stranded nucleic acids consisting of the coding nucleic acids and of complementary nucleic acids thereto, or these complementary (single stranded) nucleic acids themselves.

Furthermore, nucleic acids encoding a heavy chain variable domain and/or for a light chain variable domain of antibodies can be enzymatically or chemically synthesised nucleic acids having the authentic sequence coding for a naturally-occurring heavy chain variable domain and/or for the light chain variable domain, or a mutant thereof. A mutant of the authentic sequence is a nucleic acid encoding a heavy chain variable domain and/or a light chain variable domain of the above-mentioned antibodies in which one or more amino acids are deleted or exchanged with one or more other amino acids. Preferably the modification(s) are outside the complementary determining regions (CDRs) of the heavy chain variable domain and/or of the light chain variable domain of the antibody. Such a mutant nucleic acid is also intended to be a silent mutant wherein one or more nucleotides are replaced by other nucleotides with the new codons coding for the same amino acid(s). Such a mutant sequence is also a degenerated sequence. Degenerated sequences are degenerated within the meaning of the genetic code in that an unlimited number of nucleotides are replaced by other nucleotides without resulting in a change of the amino acid sequence originally encoded. Such degenerated sequences may be useful due to their different restriction sites and/or frequency of particular codons which are preferred by the specific host, particularly yeast, bacterial or mammalian cells, to obtain an optimal expression of the heavy chain variable domain and/or a light chain variable domain.

The term mutant is intended to include a DNA mutant obtained by in vitro or in vivo mutagenesis of DNA according to methods known in the art.

Recombinant DNA technology may be used to improve antibodies. Thus, chimeric antibodies may be constructed in order to decrease the immunogenicity thereof in diagnostic or therapeutic applications. Moreover, immunogenicity may be minimised by humanising the antibodies by CDR grafting [European Patent 0 239 400 (Winter)] and, optionally, framework modification [European Patent 0239400; Riechmann et al., (1988) Nature 322:323-327; and as reviewed in international patent application WO 90/07861 (Protein Design Labs)].

Recombinant nucleic acids may be employed comprising an insert coding for a heavy chain variable domain of an antibody fused to a human constant domain γ, for example γ1, γ2, γ3 or γ4, preferably γ1 or γ4. Likewise recombinant DNAs comprising an insert coding for a light chain variable domain of an antibody fused to a human constant domain κ or λ, preferably κ may also be used.

More preferably, CDR-grafted antibodies, which are preferably CDR-grafted light chain and heavy chain variable domains only, may be used. Advantageously, the heavy chain variable domain and the light chain variable domain are linked by way of a spacer group, optionally comprising a signal sequence facilitating the processing of the antibody in the host cell and/or a DNA coding for a peptide facilitating the purification of the antibody and/or a cleavage site and/or a peptide spacer and/or an effector molecule. Such antibodies are known as ScFvs.

Antibodies may moreover be generated by mutagenesis of antibody genes to produce artificial repertoires of antibodies. This technique allows the preparation of antibody libraries, as discussed further below; antibody libraries are also available commercially. Hence, artificial repertoires of immunoglobulins, preferably artificial ScFv repertoires, are used as an immunoglobulin source.

Isolated or cloned antibodies may be linked to other molecules, for example nucleic acid or protein association means by chemical coupling, using protocols known in the art (for example, Harlow and Lane, Antibodies: a Laboratory Manual, (1988) Cold Spring Harbor, and Maniatis, T., Fritsch, E. F. and Sambrook, J. (1991), Molecular Cloning: A Laboratory Manual. Cold Spring Harbor, N.Y., Cold Spring Harbor Laboratory Press).

Robotic Detection and Picking

In preferred embodiments, any of the steps set out in relation to the detection method, such as exposing the cells to a marker compound, image capture and analysis, as well as associated steps such as selection and/or picking of cells or colonies of interest may be conducted using automated robotic apparatus. In preferred embodiments, the robotic apparatus comprises a ClonePix FL apparatus (Genetix, New Milton, United Kingdom).

Features of a robotic apparatus which are advantageous for the performance of the methods described here, and which are present in the ClonePixFL apparatus, include any one or more of the following: cool white light illumination; up to 5 fluorescence combinations; high-resolution cooled CCD camera; ability to image at standard pixel resolution of 7 μm permitting fluorescent detection of colonies with as few as 10 cells; image zooming to 1 μm resolution for detailed colony inspection; ability to pick colonies at up to 400 clones per hour; easy-to-use custom software (ExCellerate) for intelligent picking, Halo Recognition, barcoding and clone-by-clone data tracking; stackers hold up to 10 source and collection plates, and optional Class II-type containment.

The ClonePixFL apparatus is described in detail below.

Figure 6:
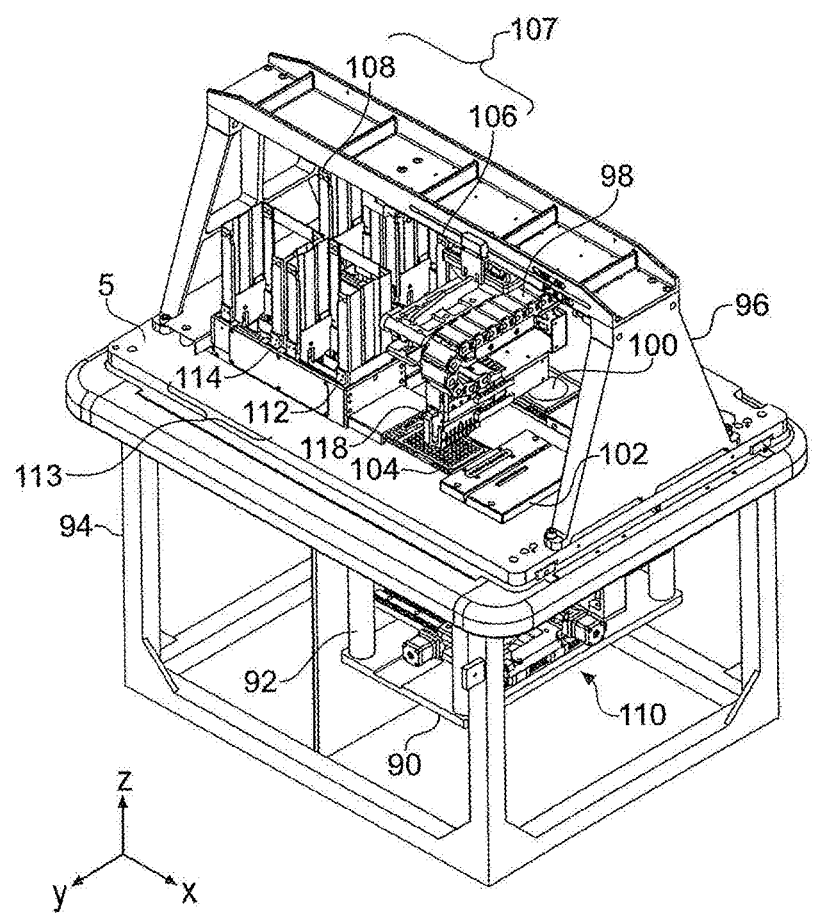
FIG. 6 is a perspective view of a robotic apparatus for carrying out methods according to the invention.

FIG. 6 is a perspective view of the ClonePixFL robotic platform for carrying out methods of the invention in an automated way. The apparatus may be considered to be a robot for picking, gel coring or other biological manipulation task with integrated fluorescence excitation and collection (i.e. detection) optics. The apparatus can be subdivided notionally into two half spaces existing above and below a main bed 5 which is supported by a frame 94.

Above the main bed 5, the apparatus appears as similar to a conventional picking robot. A cell picking head 118 is provided that comprises a plurality of hollow pins for aspirating animal cells. The cell picking head 118 is movable over the main bed 5 by a head position system made up of x- y- and z-linear positioners 98 connected in series and suspended from a gantry 96. A wash/dry station 102 is also provided on the main bed 5 for cleansing the pins. The whole upper half space of the apparatus will typically be enclosed in a housing (not shown) including a hinged door extending over one side and part of the top of the apparatus.

Below the main bed 5, an optics sub-assembly 110 is provided to accommodate fluorescence excitation and detection optics system which is mounted on a tray 90 suspended from the main bed 5 by pillars 92. The under-slung optics system is arranged to view containers such as Petri dishes and well plates placed on the imaging station 100.

In use in the performance of the detection method described in this document, a Petri dish or other container (not shown) containing cells or colonies producing polypeptides (some of interest) is placed on the imaging station 100. Such containers are referred to for convenience generically as "well plate"s in the following description, although it will be evident that they need not comprise wells. Thus, where the term "plate" or "well plate" is employed, it should be understood as encompassing any container suitable for growing cells, such as Petri dishes, microtitre dishes, 6 well plates, etc.

The main bed 5 is provided with two main working stations, namely an imaging station 100 and a replating station 104, each of which is positioned at the end of a respective well plate feed lane. Each well plate feed lane has a well plate feeder/stacker. The well plate feeder/stacker 107 for the imaging station 100 has a well plate feed storage cassette 106 and well plate (re-)stack storage cassette 108. A stack of well plates are held in the feed storage cassette 106, fed in turn down the lane via a delidder (not shown) to the imaging station 100, returned back along the lane, relidded and passed into the rear storage cassette 108. A similar well plate feeder/stacker 113 is used for the other lane to supply well plates from the storage cassette 112 to the replating station 104 and back along the lane to the (re-)stack storage cassette 114.

The well plate feeder/stacker mechanisms including delidding are described fully in EP-A-1 293 783, the contents of which are incorporated herein by reference.

It should be noted that although the description above refers the term "well plate" in the description of the "well plate feed lane at the end of the imaging station 100", the "well plate feeder/stacker 107" and the "well plate feed storage cassette 106", the term "well plate" should be taken as limiting to a container with wells. Instead, it should be treated as a generic description of any container capable of containing cells to be picked. In the performance of the detection method described herein, for example, it will be preferable to use Petri dishes or other flat dishes for growing cells producing polypeptides to be picked. Accordingly, such dishes may be used in the apparatus described with appropriate minor modifications, if necessary.

The cell picking head 118 can thus be moved from the imaging station to the replating station to allow replating of animal cells from a target well plate to a destination well plate. The arrangement described above enables a plurality of target plates, each containing cells or colonies expressing polypeptides to be picked, in containers such as Petri dishes, to be processed at the imaging station 100 in turn. The picked cells or colonies are plated onto destination well plates at the replating station 104.

In the illustrated embodiment, there is only one destination lane. However, it may be desirable in some cases to have 2, 3 or 4 destination lanes. This may be useful when it is desired to split the animal cells from a given target well into multiple destination wells. The feeder/stacker mechanism is fully modular, so the number of well plate feed lanes can be increased without difficulty.

Figure 7:
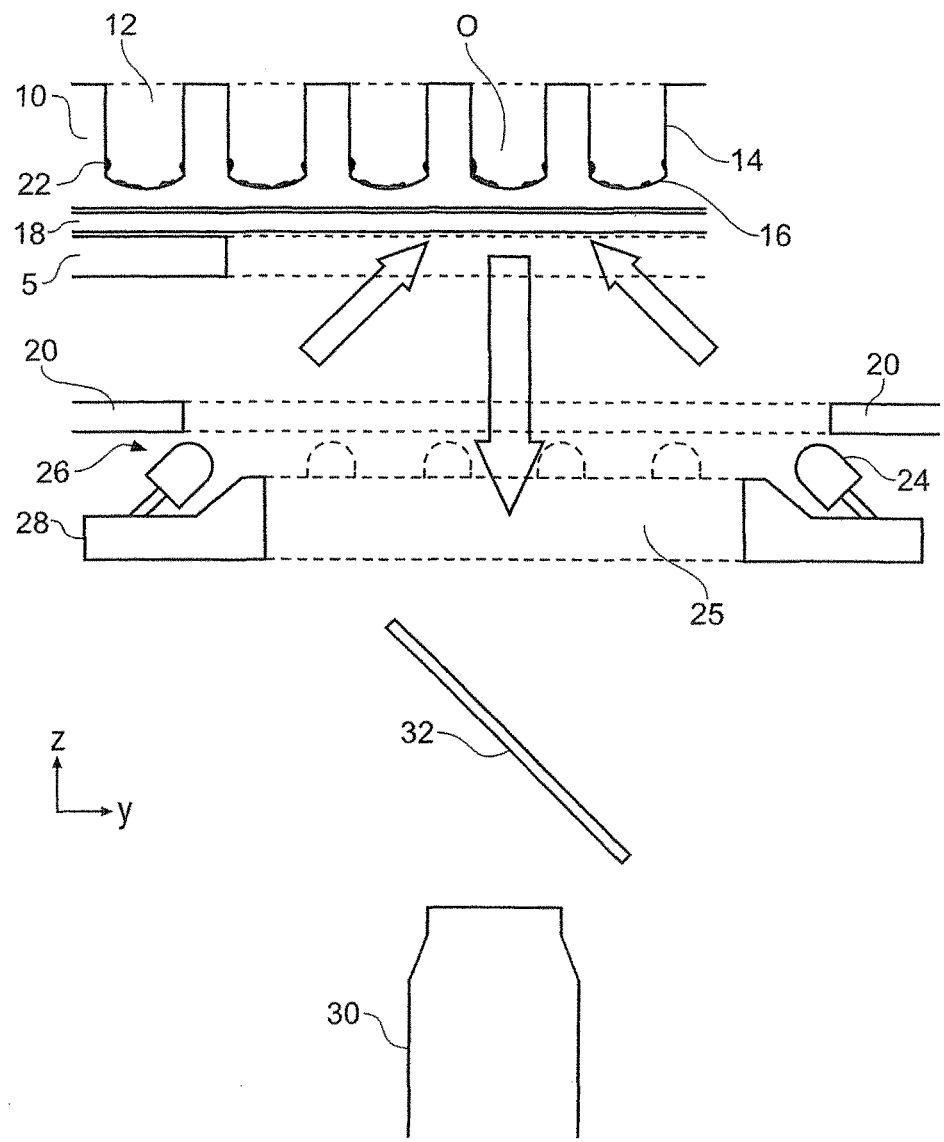
FIG. 7 is a schematic sectional side view showing the sample excitation and collection paths in the vicinity of the sample using a well plate as an example sample container.

FIG. 7 is a schematic sectional side view showing principles of the design of the optical sub-assembly 110. Part of a well plate 10 showing 5 wells is also shown. Adherent colonies 22 have been cultured in the wells also as shown, the colonies forming around the base 16 and lower sidewalls 14 of the wells 12. It will be appreciated that samples in other containers may also be studied, such as Petri dishes described above. In such containers, particularly those which contain semi-solid media such as methylcellulose, cells and colonies are growing in the media.

The imaging station is formed in an aperture in the main bed 5 covered by a sheet of optically transparent material, typically glass, that forms a light table 18. For optical analysis, a well plate 10 is arranged on the light table 18 as shown, having been deposited there by the well plate feeder/stacker. The apparatus is designed to image one well at a time. To image a specific well 12 of a well plate, the optical sub-assembly 110 is aligned relative to the well 12.

The optical sub-assembly 110 comprises two illumination sources and a collection part.

The first illumination source is formed of a plurality of white light emitting diodes (LEDs) 24 arranged to form an LED ring 26 located in a collar 28 with a central aperture 25 with the optical axes of the LEDs lying on the surface of a common cone, the point of which is coincident and labeled as the object position O in the figure. This white light source is provided principally to collect conventional images of the sample, for example as are used for performing cell confluence detection by image processing techniques. An apertured top plate 20 lying above the LED ring 26 is also illustrated. This is a structural component and has no significance for the optical design.

This second illumination source (not shown in this figure) is arranged to illuminate from the side, as shown by the sideways arrow, onto a semi-silvered mirror 32 which deflects the excitation light vertically onto the sample, as shown by the upwardly pointing arrow, in order to perform fluorescence measurements.

The collection part of the optical sub-assembly is made up of a zoom lens 30 with autofocus and is used to collect light when either (or both) of the illumination sources is used. The optical axis is vertical and coincident with the object position O.

The well to be imaged is thus aligned laterally with the optical axis of the collection optics and the fluorescence excitation optics and laterally and vertically with the center point of the white light lateral illumination, whereby the center point of the lateral illumination is around the base of the well or slightly higher as illustrated. The LEDs 24 thus illuminate a well 12 arranged in the object position O at an oblique angle from below so that an image of the well 12 is taken in a dark field configuration where light from the LEDs, if not scattered, does not contribute to the well image gathered by the collection lens 30.

Figure 8:
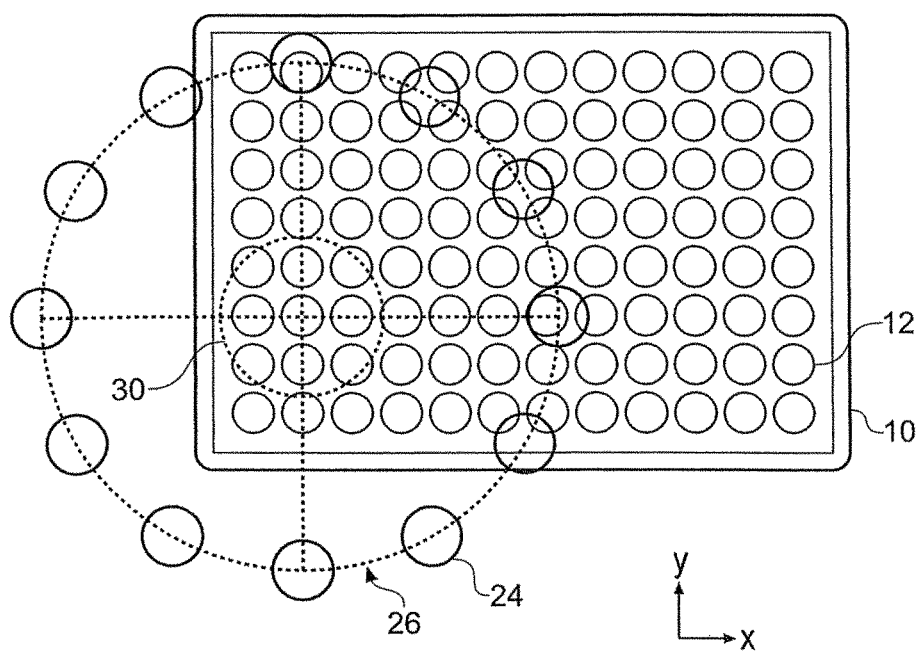
FIG. 8 is a schematic plan view of the sample vicinity with a well plate as the sample container.

FIG. 8 is a schematic plan view of selected parts of the optical system shown in FIG. 7. The well plate 10 is a 96 well version and is shown aligned with the optical sub-assembly 110 so that a well 12 three rows up (row m=3) and two columns along (column n=2) is targeted, as illustrated by the objective lens 30 and LED ring 26 of LEDs 24. The optical sub-assembly is arranged on x- and y-positioners so that the collection lens 30 and illumination ring 26 can be moved together to image any one of the wells 12. Typically, the wells will be imaged in sequence row-wise and column-wise with a rastering process. This is achieved by moving the optical sub-assembly while the well plate remains static which is preferable so that liquid in the wells is not shaken by moving the well plate between imaging each well which might have an adverse influence on the imaging.

It will be appreciated that the ability of the apparatus to image a growing container comprising a single well may be extended to enable imaging of a growing container of any suitable size. Thus, samples in other (larger) containers may also be studied, such as Petri dishes described above suitable for use in the detection method described in this document. In such dishes, the cells or colonies will be scattered more or less randomly across the surface of the plate, instead of being arranged in a row/column configuration. Nevertheless, the x- and y-positioners do not restrain the collection lens 30 and illumination ring 26 to movement in a discrete fashion, but these are instead movable continuously across the surface of the plate. Accordingly, the x- and y-positioners enable any portion of the plate to be imaged by the collection lens 30 and illumination ring 26.

Figure 9A:
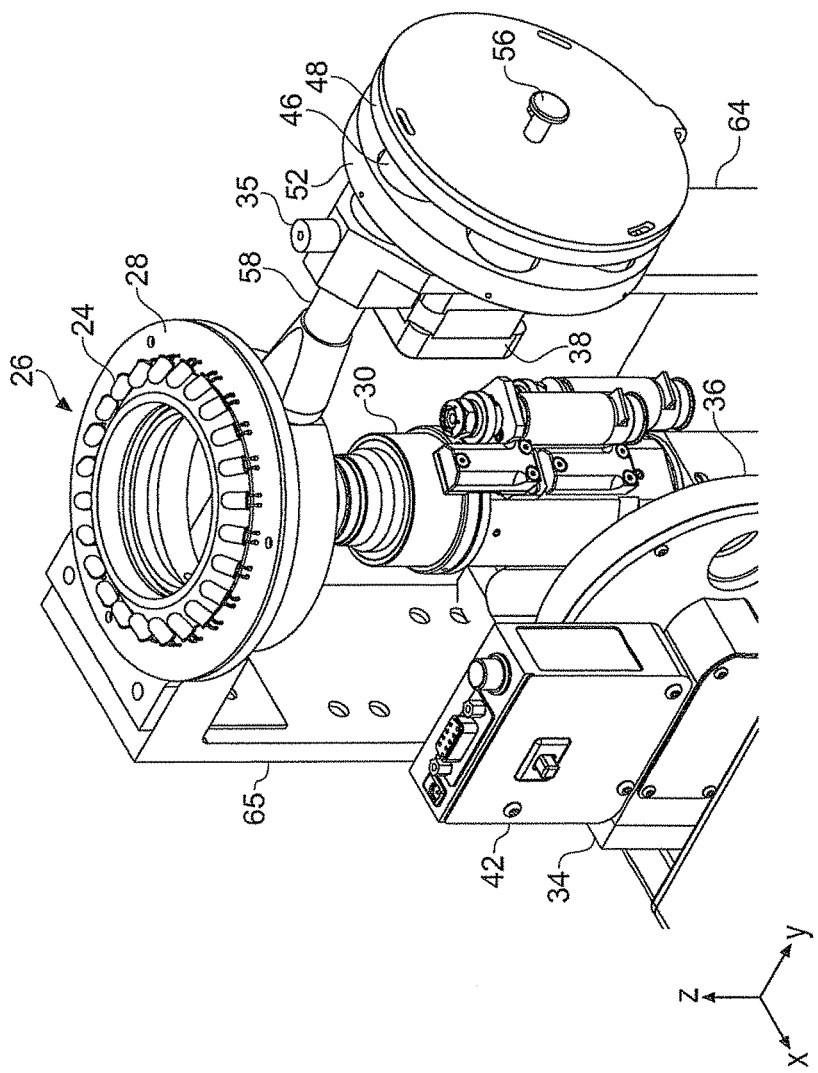
FIGS. 9A, 9B and 9C are perspective and orthogonal side views of the optics sub-assembly arranged below the main bed of the apparatus of FIG. 6.
Figure 9B:
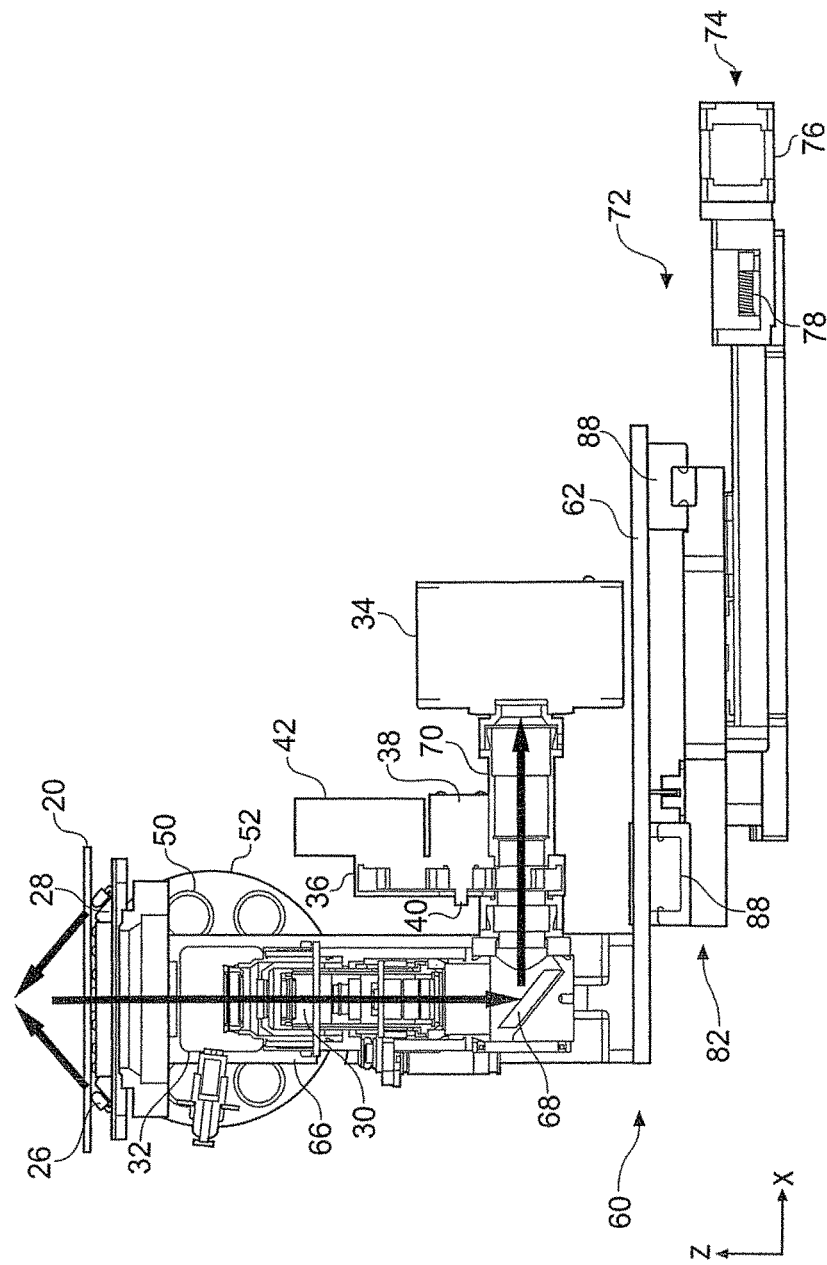
Figure 9C:
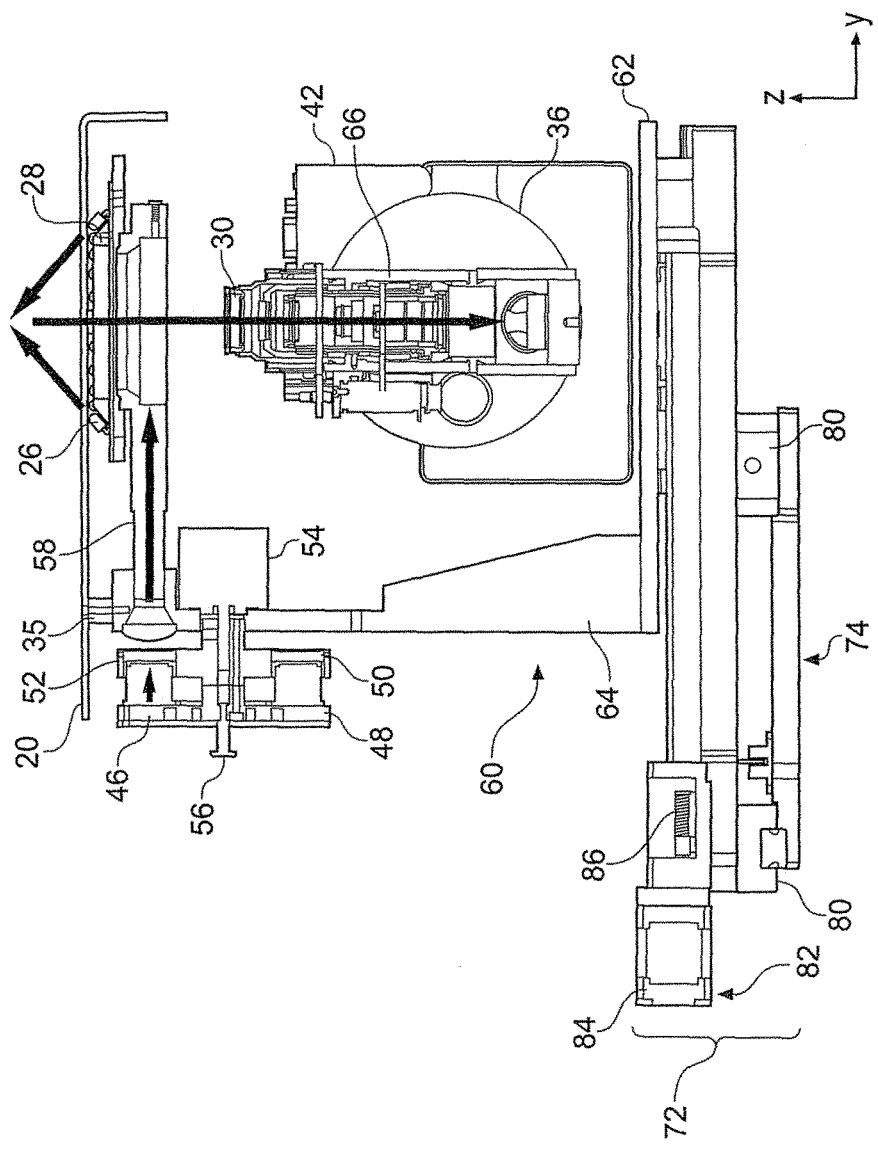

FIGS. 9A, 9B and 9C are perspective and orthogonal side views of the optics sub-assembly arranged below the main bed of the apparatus of FIG. 6. These three figures are described together, rather than in turn, since they are different views of the same equipment, noting that not all features are visible or marked with reference numerals in each figure.

The previously described collar-mounted LED ring 24, 26, 28 is evident in all three figures. The LED collar 28 is cantilevered out on a side bracket from a vertical mounting plate 65 (FIG. 9A) which is part of a frame 60. The vertical mounting plate 65 is upstanding from a base plate 62.

The fluorescence excitation optics is mounted on the base plate 62 via a further vertical mounting plate 64. The excitation source is colored LEDs 44 (not shown) that are arranged in groups of different colors 46 on a wheel 48 which is a converted filter wheel with LED groups 46 arranged at each filter position. In front of each LED group 46 there is a bandpass or other suitable narrowband filter 50 (see FIGS. 9B & 9C) each arranged in the filter position of a further filter wheel 52 arranged coaxially and on the same motor spindle 56 as the filter wheel 48, the two wheels being driven in unison by a motor 54. Each bandpass filter 50 is selected to transmit a range of wavelengths matched to the emission wavelength band of the LED group 46 with which it is paired. Light from the uppermost LED group 46 is directed horizontally through a light pipe 58, which is not a waveguide, merely a shroud for preventing light spillage, onto the semi-silvered mirror 32 (see FIG. 9B and also FIG. 7) which serves as a beam splitter for directing a portion of the colored LED light through the LED collar's aperture 25 to the object position. Other forms of beam splitter could also be used, for example a cubic beam splitter. The beamsplitter is preferably removable, or movable away from the aperture 25 so that when lateral illumination from the colored LED groups is not needed, it can be taken out of the collection path so that it does not result in loss of collected signal. A mounting stub 35 is also evident in FIGS. 9A and 9C. This mounting stub 35 is for connecting the colored LED group features to the top plate 20 (removed in FIG. 9A, but shown in FIGS. 9B and 9C and also FIG. 7).

The collection lens 30 is held vertically in a mounting tube 66 (see FIGS. 9B & 9C) at the base of which is arranged a plane deflecting mirror 68 which redirects the collected light horizontally and supplies it along a light pipe 70 to a CCD camera 34. Part way along the light pipe 70 there is arranged a filter wheel 36 mounted on a spindle 40 and driven by a motor 38. Drive electronics for the filter wheel 36 are housed in a unit 42. Typically filters will be used in the collection optics to filter out excitation light from the colored LED groups 46 when spectroscopic measurements are being performed. Collection side filters 45 may also be useful for filtering out fluorescence, e.g. to stop fluorescence from swamping out contrast of the cell periphery. This might be auto-fluorescence or fluorescence from a tag. For straightforward confluence detection using the white LEDs 24, no filter may be needed on the collection side.

The optical components are thus all mounted directly or indirectly on the base plate 62. The base plate 62 is carried by a linear positioner 82 which is in turn carried by a linear positioner 74 to provide xy-motion for the whole optical set-up. In the illustration, the x-positioner 74 is at the bottom with the y-positioner mounted on top of it. However, it will be appreciated this choice is arbitrary. It will also be appreciated that a parallel mechanism xy-positioner could be provided instead of two piggy-backed linear positioners. The x-positioner 74 comprises a motor 76, lead screw 78 and a pair of sets of guide bearings 80. The y-positioner 82 is the same, comprising a motor 84, lead screw 86 and a pair of sets of guide bearings 88.

As an alternative to having colored LED of different colors arranged in filter positions on a filter wheel as described above, it is possible to have concentric rings of different colors of LED in a single mounting. For example, the white light LED ring could be exchanged or supplemented with a number of LED rings of different colors. In principle an arbitrary arrangement of LEDs of different colors would provide the same functionality so long as LEDs of different colors could be driven independently, but would be a less elegant design. It would also be possible to use a single group of broadband LEDs in combination with filtering. However, this approach would tend to provide less illumination power than using different colors of LED. It will also be appreciated that other optical sources could be used including superfluorescent LEDs or diode lasers. Fixed wavelength or tunable diode lasers may be used.

By way of example, the table below gives, for a number of useful dyes, suitable LED types for the excitation LED groups 46 together with suitable pairs of excitation side filters 50 and collection-side (i.e. emission) filters 45. The peak excitation and emission wavelengths λ of the example dyes are also stated.

| Dye | Peak Excitation λ (nm) | Peak Emission λ (nm) | LED Type | Excitation Filter | Emission Filter (Chroma Co.) |
|---|---|---|---|---|---|
| BFP | 381 | 445 | UV | none | D460/50m |
| CFP | 434 | 477 | Royal Blue | D(HQ)450/50X | D505/40m |

-continued

| Dye | Peak Excitation λ (nm) | Peak Emission λ (nm) | LED Type | Excitation Filter | Emission Filter (Chroma Co.) |
|---|---|---|---|---|---|
| EGFP | 488 | 507 | Blue | D(HQ)470/40X | HQ535/50m |
| FITC | 490 | 525 | Blue | D(HQ)470/40X | HQ535/50m |
| YFP | 513 | 527 | Cyan | D(HQ)500/30X | D550/40m |
| Rhodamine | 550 | 573 | Green | D(HQ)530/30X | HQ590/50m |
| DSRed | 565 | 582 | Green | D(HQ)530/30X | HQ590/50m |
| Cy5 | 649 | 670 | Red | D(HQ)623/36X | HQ700/75m |

Figure 10:
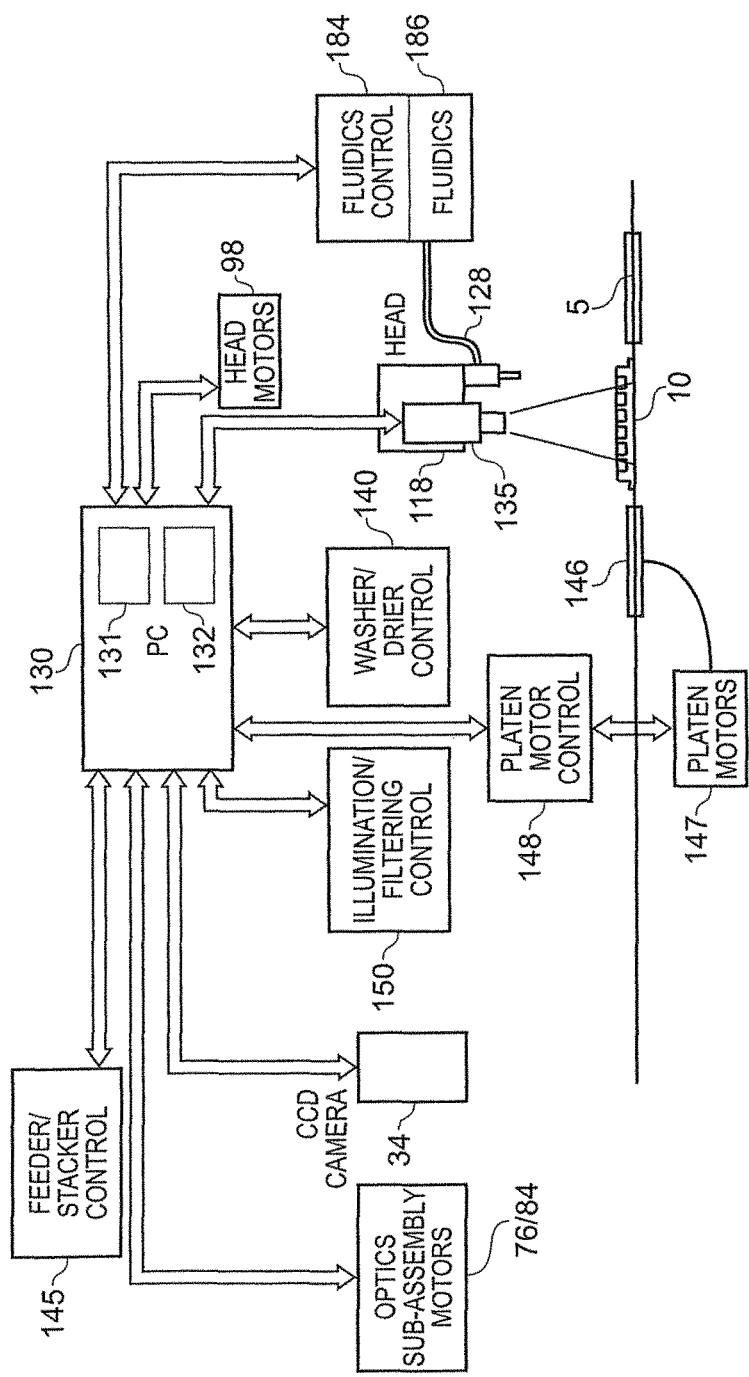
FIG. 10 is a block schematic diagram showing the control system of the apparatus.

FIG. 10 is a block schematic diagram showing the control system of the apparatus for coordinating the various components to perform the processes described above. A computer (PC 130) is used as the principal control component and is connected by electronic links using standard interfacing protocols to the various components that are part of the automated control system. The control is effected by control software 131 resident in the PC 130. Image processing and spectroscopic analysis software 132 is also resident in the PC 130 and linked to the control software 131. The image processing and spectroscopic analysis may also be carried out in hardware or firmware if desired. The CCD camera 34 is connected to the PC 130 for receiving digital images captured by the camera 34. An illumination and filter controller 150 is connected to the PC 130 for controlling the various under-bed optical sources and filter wheels of the optical sub-assembly 110. A washer/drier controller 140 is connected to the PC 130 and used to control the blower and the halogen lamps of the wash/dry station 102. The positioners 98 for moving the head 118 are connected to the PC 130. The PC 130 is also connected to the motors 76 and 84 of the x- and y-positioners of the under-bed optics sub-assembly 110. A head-mounted camera 135 is also provided for machine vision, such as bar-code detection on plates, and is connected to the PC 130 for receiving digital images captured by the head-mounted camera 135. These are used for aligning the pins of the head with the various locations of interest such as the wash/dry station 102, plates etc. The fluid lines 128 are connected to the fluidics unit 186 which is controlled by the fluidics control unit 184 connected to the PC 130. The fluidics control unit 184 is used to control the pressure in the fluid lines to allow aspiration, retention and expulsion of liquid from the sample. The fluidics control unit 184 also controls the wash cycle of the pins and fluid lines, whereby cleaning fluid from the baths is aspirated and expelled from the ends of the pins during the cleaning cycle. A feeder/stacker control unit 145 is also provided for the feeder/stacker units, including the plate supply lanes, and is connected to the PC 130. Separate units 145 may be provided for each lane in view of the modular nature of the feeder/stacker assemblies. The figure also illustrates schematically an optional feature whereby a carrier in the form of a platen 146 is provided to carry one or more plates 10 or other biological sample containers. The platen 146 is movable in the x- and y-directions by associated motors 147 and motor controller unit 148 which is connected to the PC 130, these elements collectively forming a positioning system for plates or other containers arranged on the apparatus. The platen can then be moved in a controlled fashion to allow iterative scanning by the optical system across all wells of a plate. The platen may be provided with an integral heating element, so that plates or other biological sample containers carried by the platen can be maintained at elevated temperatures, for example to promote enzymatic activity in the samples.

It will thus be appreciated that lateral positioning can be achieved in a variety of ways either by moving the optical source and detector on a common platform under the bed of the apparatus, moving the sample with its own xy-positioning system on the sample carrier, or by moving the head. In any given apparatus or process, various combinations of these motion systems may be used.

In summary, the described robotic apparatus has a sample manipulation head with associated positioning system mounted above the main bed of the apparatus, and can be used for picking of cells, in particular animal cells, or for other biological or chemical applications. An imaging station is arranged on the main bed where a sample container containing a sample can be placed in an object position. Both excitation and collection optical sub-systems are mounted under the main bed of the apparatus for performing spectroscopic analysis on a sample at the imaging station. The integration is based on a reflection mode optical solution, which allows all the optical components to be mounted under the main bed of the apparatus. Consequently, ancillary software driven or manual processes can be carried on with whether or not spectroscopic measurements are being made.

However, it will be appreciated that methods according to the invention can be performed on different apparatus than described herein. In particular, imaging tasks can be carried out in a conventional stand-alone imager, such as a Fuji LAS-1000, and picking tasks with a conventional picking robot, such as a Genetix QPix™.

Computer Implementation

Aspects of the invention may be implemented in hardware or software, or a combination of both. However, preferably, the methods of the invention are implemented in one or more computer programs executing on a programmable processor in a computer, imaging or cell picking apparatus as described herein. The computer or apparatus may further comprise at least one data storage system (including volatile and non-volatile memory and/or storage elements), at least one input device, and at least one output device. Program code is applied to input data to perform the functions described herein and generate output information. The output information is applied to one or more outputs, in known fashion.

Each program may be implemented in any desired computer language (including machine, assembly, high level procedural, or object oriented programming languages) to communicate with a processing system. In any case, the language may be a compiled or interpreted language. Each such program is preferably stored on a storage media or device (e.g., ROM, CD-ROM, tape, or magnetic media) readable by a general or special purpose programmable processor, for configuring and operating the processor when the storage media or device is read by the processor to perform the procedures described herein. The inventive system may also be considered to be implemented as a computer-readable storage medium, configured with a computer program, where the storage medium so configured causes a processor to operate in a specific and predefined manner to perform the functions described herein.

EXAMPLE 1

Statistical Methods for Analysis of Colony-associated Fluorescence Using ClonePix FL™ Apparatus In this example, the ClonePix FL™ apparatus is configured to acquire images of fluorescing cell colonies and to generate a range of statistics from the images. The images are analysed in order to identify colonies expressing a polypeptide of interest at a high level.

Measuring Fluorescence

The ClonePix FL™ apparatus as described above is configured to detect colony boundaries using white light. White light images are first obtained of a plurality of cell colonies. All of the detection algorithms in the software process the white light images to detect colony boundaries.

There are two principal advantages to this approach: firstly, colonies that are not fluorescing can still be detected and taken into account when deciding which colonies to select; and secondly because knowing the boundaries of all colonies allows for a more rigorous approach to processing the fluorescent images.

Fluorescent colonies can be divided into exactly two types: firstly those whose fluorescence is purely 'internal', i.e. within the colony boundary as determined from the white light image, and secondly those whose fluorescence disperses into the surrounding medium.

Generating statistics for the first type of fluorescent colony is straightforward, since for any given pixel in the image, the pixel is either within the boundary of exactly one colony, or it is a background pixel and can be ignored. The only complication is determining what proportion of the pixel's intensity is 'real' fluorescence, and what proportion is 'background' fluorescence which would exist in even in the absence of any colonies (since fluorescence images rarely have a background of zero—pure black).

Generating statistics for the second type of fluorescent colony—those whose fluorescence disperses into the surrounding medium—is more problematic. This is because when two or more of these colonies are close together, their fluorescence will mingle together and it is not immediately apparent which proportion of a given pixel's intensity can be attributed to each colony. The problem is compounded as the density of colonies increases (i.e. when there are more colonies in each plate). Additionally, fluorescence dispersed from type two colonies can affect type one colonies, which can therefore no longer be assumed to be independent of other colonies.

Because of this difficulty, the ClonePix FL software is not configured to determine what proportion of intensity of pixels outside of colony boundaries come from any particular colony. Instead, all of the pixels surrounding each colony are included, as explained below. This results in some pixels being included in the total for several colonies, but this is not a problem, as described below.

It is important to appreciate that the present method measures relative fluorescence, not absolute fluorescence. This means that fluorescent statistics can only meaningfully be compared when generated from the same plate at the same time—it is not necessarily meaningful to compare fluorescent statistics between different plates imaged on different days. This is because a number of things can vary that affect fluorescence, for example exposure time. Simply varying the exposure time used when acquiring fluorescent images will increase or decrease the absolute values of the fluorescent statistics. However, all colonies will in general get brighter or darker thus their brightness relative to each other is unaffected.

Examples of Fluorescent Statistic Generation

The white light image shown in FIG. 1 shows two colonies close together. Their approximate boundaries, as determined by a colony detection algorithm are shown boxed.

Figure 19:
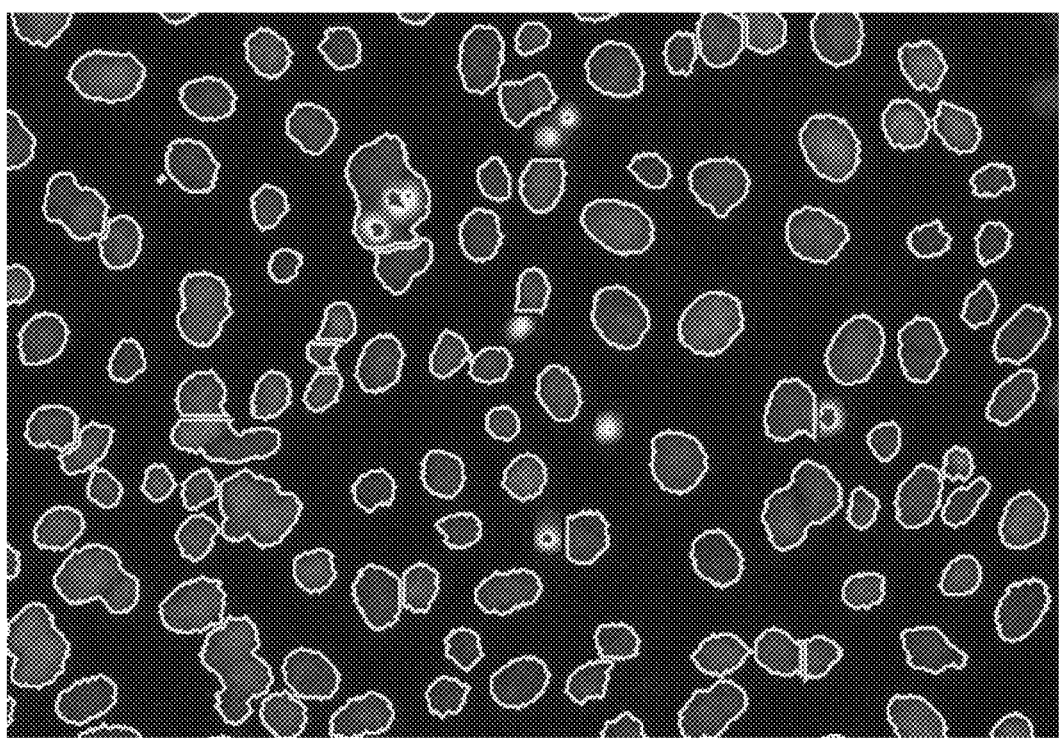
FIG. 19 shows a plurality of cells in a visible light image, the boundaries of which have been identified by a colony detection algorithm.

FIG. 19 shows a plurality of cells in a visible light image, the boundaries of which have been identified by a colony detection algorithm.

Figure 2:
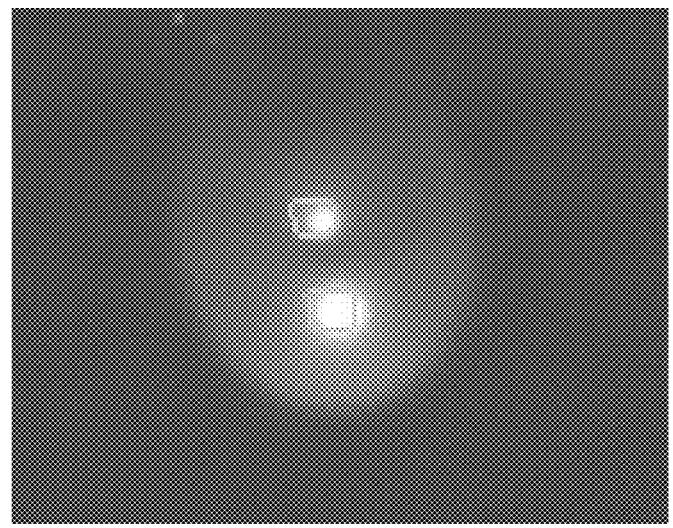
FIG. 2 shows a fluorescent image of the cell colonies shown in FIG. 1. The cells have been labelled with a fluorescent marker compound which binds to a polypeptide of interest produced by the cells. The image is obtained using an automated imaging apparatus.

A fluorescent image corresponding to the image of FIG. 1 is shown in FIG. 2. A background subtraction algorithm is applied to all fluorescent images before intensity statistics are generated. This algorithm seeks to determine what level of fluorescence there would be in the absence of any colonies, and removes this from the image so that the intensity statistics only include 'real' fluorescence.

A number of fluorescent statistics can be generated directly from this fluorescent image.

Interior Intensity Statistics

The simplest statistic is Interior Total Intensity. This is simply the sum of the intensities all of the pixels within the colony boundary. Clearly, larger colonies will have larger totals in part simply because they are larger. This statistic is not therefore especially useful on its own—but several other statistics are derived from it.

Interior Mean Intensity is Interior Total Intensity divided by colony area (in pixels). It is the 'average' brightness of each pixel within the colony. Since it does take account of area, this statistic can be used to compare colonies with different areas. Colonies with a high Interior Mean Intensity are overwhelmingly likely to be bright colonies—rather than simply faint colonies that happen to be near a bright colony that is dispersing fluorescence into the surrounding medium.

Interior Intensity SD (Standard Deviation) is a measure of how the intensity of pixels within a colony boundary varies. Colonies with a low value for this statistic must have pixels that are all of a similar brightness. Conversely, those with high values will have both bright pixels and faint pixels with their colony boundaries. This statistic can be used to differentiate between colonies that have similar Interior Mean Intensity Values.

Interior Median Intensity is the intensity of the pixel midway between the faintest pixel and the brightest pixel within the colony boundary. This is similar to Interior Mean Intensity described above, but may be more useful in certain applications since its value is less affected by a few bright or a few faint pixels than the mean intensity. As with Interior Mean Intensity, colonies with a high Interior Median Intensity are very likely to be bright colonies.

Interior Mean Centre Intensity is simply the mean intensity of the nine pixels closest to the centre of the colony (i.e. the centre pixel and its immediate eight neighbouring pixels). Often, colonies are brightest at their centre so this statistic provides an 'unbiased' measure of the brightness of a colony.

Exterior Intensity Statistics Calculation

Figure 3A:
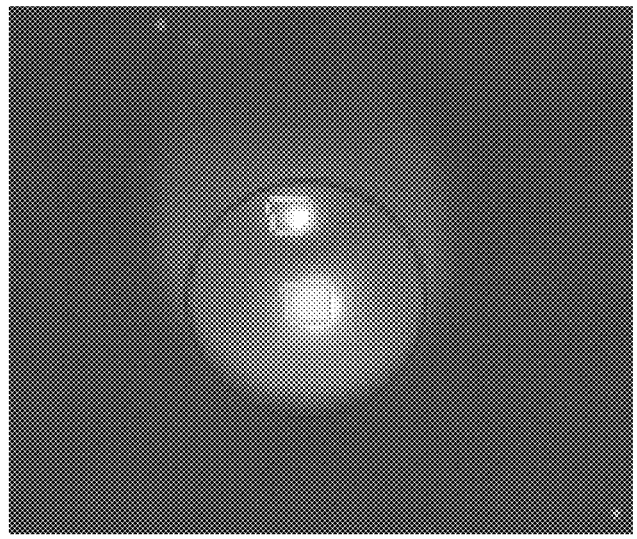
FIG. 3A shows the fluorescent image of FIG. 2 with the lower colony highlighted and surrounded by a circle which represents a predefined area.
Figure 3B:
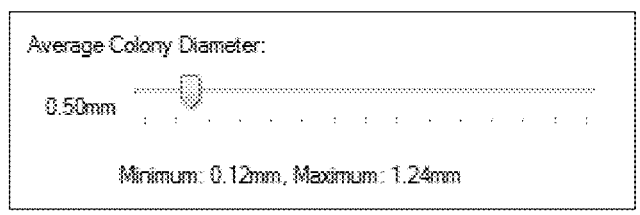
FIG. 3B shows a selector for the circle diameter based on an average colony size provided by the user.

The image in FIG. 3A shows the fluorescent image with the lower colony highlighted. Around the colony a circle is drawn (simply moving the mouse pointer over a colony in the ClonePix FL software achieves this). The diameter of the circle is derived from an 'Average Colony Diameter' value provided by the user when the image was originally processed—the selector for this is shown in FIG. 3B. In this case, the user had selected a colony diameter of 0.5 mm. The circle is drawn at three times this diameter, which in this case is 1.5 mm. This circle encloses a predefined area within which a signal level is determined. It is important to appreciate that the size of this circle is the same for every colony in the image, even though the colonies themselves are different sizes.

The significance of the circle is that it defines the boundary within which pixels for a given colony are processed to generate the 'exterior intensity' statistics. The process works as follows. For a given colony, firstly all of the pixels within the circle are considered. From this circle of pixels, any pixels within the colony of interest's boundary are excluded—the pixels shaded in the centre colony in the image of FIG. 3A.

Next, all of the pixels that lie both within the circle and within any other colonies are also excluded. So in the image of FIG. 3A, all of the pixels within the boundary of the second, unshaded colony are also excluded. This is because any fluorescence within a neighbouring colony's boundary is quite likely to have come from the neighbouring colony. What remains are the pixels that are local to the colony of interest but not within any colony boundary. It is these pixels that are used to generate the 'exterior intensity'—those which are shaded within the circle in the image in FIG. 4, but not within the boxed areas.

Note that if the colony is very much bigger than the 'average colony diameter' specified by the user, or if the colony is an odd shape, it is possible that some of the pixels within the colony boundary lie outside the circle. In those circumstances, the circle will not be a good approximation to the area 'local' to the colony. However, it is not clear how to meaningfully compare these sorts of colonies with the more usual sort since it is unlikely that any definition of 'local' area gives values that can usefully be used for comparative purposes.

Neighbouring colonies are treated in exactly the same way. In the image in FIG. 5, the neighbouring colony higher up the image in FIGS. 1 to 4 has been selected. Clearly, this circle overlaps the circle for the lower colony and many of the pixels will be counted in both. However, in this example both colonies are clearly fluorescing and both are obviously type two colonies, dispersing their fluorescence into the local medium. For those pixels close to both colonies, it is not clear what proportion of the intensity of each pixel is derived from which colony. The area of fluorescence around the colonies in fact looks quite uniform—implying that the fluorescence from each colony isn't cumulative—which suggests that counting the intensities of the pixels twice (once from each colony) is not an unreasonable approach.

Exterior Intensity Statistics

Figure 4:
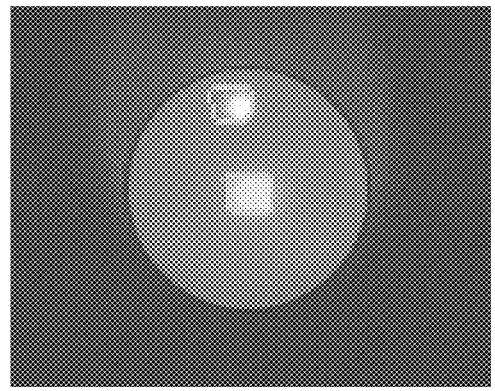
FIG. 4 shows the pixels that are used to generate the 'exterior intensity', i.e. those which are shaded within the circle but not within the boxed areas.
Figure 5:
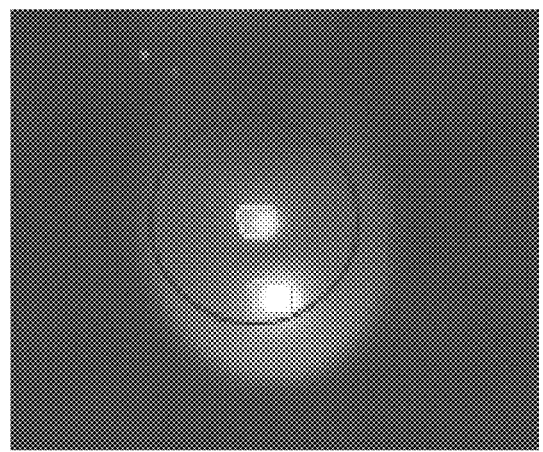
FIG. 5 shows the selection of a neighbouring colony higher up the image in FIGS. 1 to 4.

Exterior Area ($mm^2$) is simply the area of the 'exterior' pixels (those shaded within the circle but not within the boxed areas in the image of FIG. 4). If this value is much lower for a given colony as compared to other colonies in the image, the exterior intensity statistics for that colony may not be very accurate. It could be used to exclude colonies that are in crowded regions of the plate.

Exterior Total Intensity is the sum of the intensities of all of the 'exterior' pixels. If there are neighbouring colonies within the circle, this value will be lower. On its own, this statistic is not very useful since it cannot be used comparatively with other colonies.

Exterior Mean Intensity is the Exterior Total Intensity divided by the number of pixels in the exterior area. This statistic provides a good approximation of how bright the area immediately surrounding a given colony is. As demonstrated below, this value has surprisingly been found to be the most accurate predictor of productivity of a colony.

Exterior Median Intensity is simply the intensity of the pixel midway between the brightest and the faintest pixel within the exterior pixels. Exterior Median Intensity may be used instead of Exterior Mean Intensity in certain applications.

Sum Total Intensity seeks to approximate what the sum of the Exterior Total Intensity and Interior Total Intensity would be if there were no neighbouring colonies within the circle. Instead of using the actual Exterior Total Intensity, it instead uses the Exterior Mean Intensity multiplied by the number of pixels within the circle excluding the pixels with the colony of interest's boundary but including any pixels in neighbouring colonies in the circle. If this calculation were not taken into account, it would not be meaningful to compare Sum Total Intensity between colonies, since the value would vary depending on if there were neighbouring colonies.

Normalized Intensity is simply Sum Total Intensity divided by colony area (in pixels). Intuitively, the highest secreting colonies will have the highest values here, though unfortunately in practice normalising by area biases the statistic strongly in favour of small colonies, rather than bright colonies. This is because the interior intensity is always very much brighter than the exterior intensity—which drops off exponentially from the colony boundary.

When calculating a Mean Intensity (Exterior or Interior) value as described above, the mean may be an Arithmetic or Geometric Mean. Generally when referring to a mean intensity, the arithmetic mean (i.e. the sum of all the intensity values in the area divided by no. of pixels) is contemplated. However, the geometric mean (i.e. the nth root of the product of all the intensity values in the area, wherein n is the no. of pixels) may also be used.

In various embodiments of the present invention, one or more of the above intensity statistics may be calculated. Preferably exterior (arithmetic or geometric) mean intensity, exterior median intensity or sum total intensity is used.

EXAMPLE 2

Correlation Between Statistical Parameters and Productivity of Polypeptide Producing Colonies By growing colonies of cells in semi-solid media, cells can be cloned in one step. The ClonePixFL™ apparatus can screen the clones for growth and secretion, isolating only the highest value clones. In populations where differences in the population are slight, the "highest value" clones can be determined by different statistical measurements. These statistical measurements will identify different clones within the population and yield different results. Small differences in productivity can make a huge difference to cost when it comes to producing antibody on an industrial scale. Therefore in the present example various measurements were analysed in order to determine which provided the best correlation with productivity of the polypeptide of interest.

A mixed population of CHO DG44 cells transfected with a gene encoding a human IgG were seeded into semi-solid media to give 20× Petri-1-well plates. An FITC-labelled anti-human IgG (CloneDetect K8200, Genetix Ltd, New Milton, UK) was added to the media and cells at Day 0. This fluorescently labelled antibody serves as a marker compound in the present method, for identifying colonies which produce the polypeptide of interest (human IgG) at a high level. The labelled antibody binds to human IgG within producing colonies as well as to secreted IgG found in the area surrounding the colony.

At Day 10, the plates were divided into 4 batches to be picked based on the following 4 fluorescence statistical measurements as described above: Group A: Exterior Mean Fluorescence Intensity; Group B: Normalized Fluorescence Intensity; Group C: Interior Mean Fluorescence Intensity; Group D: Sum Total Fluorescence Intensity.

Clones picked from each group were allowed to start growing in the 96 well plates for 7 days. The media was then refreshed and supernatants taken for ELISA 5 days later. The ELISA method permits a precise, quantitative determination of the level of human IgG produced by each colony. ELISA values were compared across the groups to determine which statistical determination gave the best clones. The best clones were then compared back to the fluorescence values to determine where they were placed in the ranking and look for a correlation.

Figure 11:
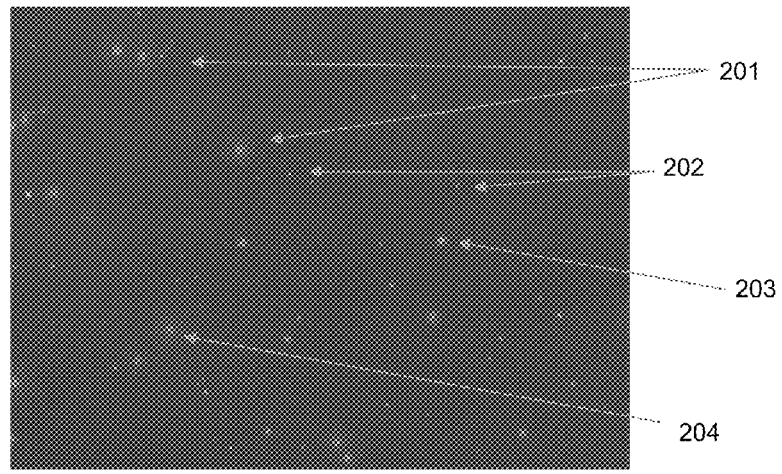
FIG. 11 shows a composite brightfield and FITC fluorescence (200 ms) image of colonies of CHO DG44 cells growing in semi-solid media, obtained by an automated imaging apparatus.

FIG. 11 shows a composite brightfield and FITC fluorescence (200 ms) image of the colonies of CHO DG44 cells growing in semi-solid media, obtained by the ClonePixFL apparatus. The colonies showed a number of distinct phenotypes. Some clones (201 in FIG. 11) are of a relatively large size and show a significant halo indicating good secretion. Other clones, which may be small (202) or large (203), have a brightly fluorescent interior indicating high expression of the transgene but do not show a significant halo (indicating low secretion). Finally, some small clones (204) show a significant halo indicative of high secretion of the human IgG.

Figure 12:
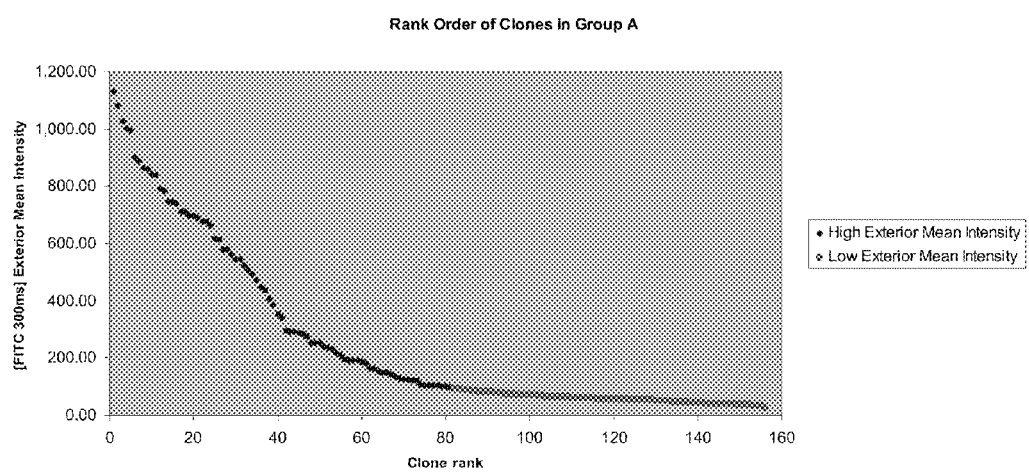
FIG. 12 shows a ranking of cell colonies according their exterior mean intensity of fluorescence.

As shown in FIG. 12, the clones in Group A were ranked according their exterior mean intensity of fluorescence (FITC 300 ms). A cut off value of exterior mean intensity was applied to divide the clones into those with high and low intensity values. In this case, a cut-off value of 90 U exterior mean fluorescence intensity was selected.

Figure 13:
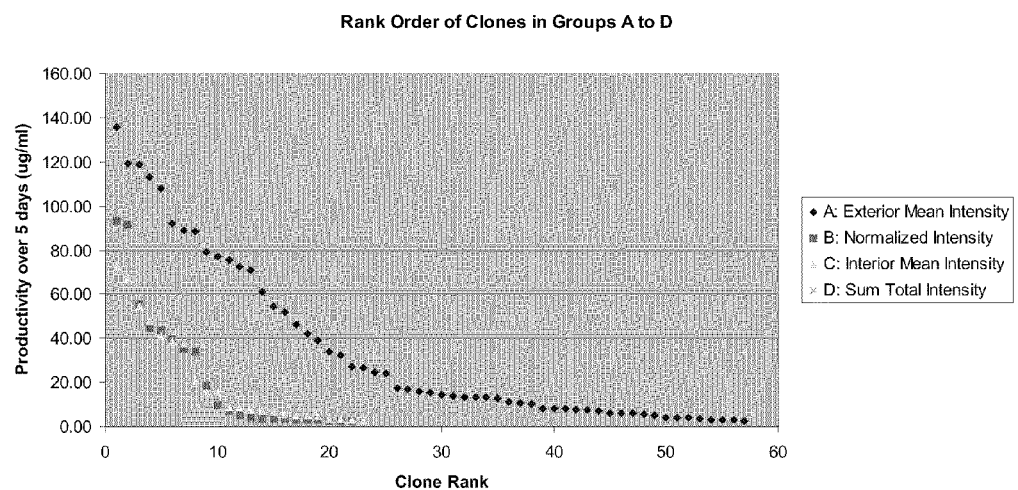
FIG. 13 shows a plot of colony rank (determined by each of four different fluorescence statistics) against productivity of a polypeptide of interest.

The clones in Groups B to D were also placed in rank order according to their respective statistical fluorescence parameters as described above. Their rank order was then plotted against productivity of human IgG over 5 days as determined by the ELISA assay. The results are shown in FIG. 13.

Figure 14:
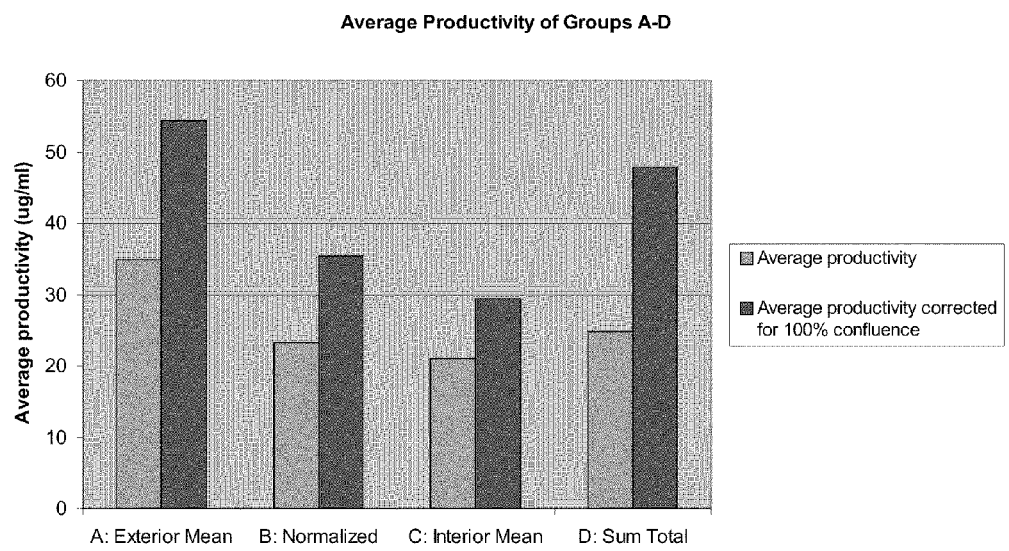
FIG. 14 shows average productivity values for colonies selected using different statistical parameters, either uncorrected or were for 100% confluence.

A cut off value was applied to each group as described above for Group A to select a sub-group of the highest ranking colonies. The average productivity of the high ranking clones from each of Groups A to D was then determined. The productivity values were corrected for 100% confluence. The results are shown below in Table 1 and in FIG. 14:

|  | n | Average Productivity | Productivity corrected for 100% confluenece |
|---|---|---|---|
| A: Exterior Mean | 57 | 34.91 | 54.28 |
| B: Normalized | 22 | 23.22 | 35.31 |
| C: Interior Mean | 23 | 21.05 | 29.33 |
| D: Sum Total | 40 | 24.80 | 47.79 |

Productivity values are given in μg/ml of human IgG in the culture supernatant, as determined by ELISA.

Figure 15:
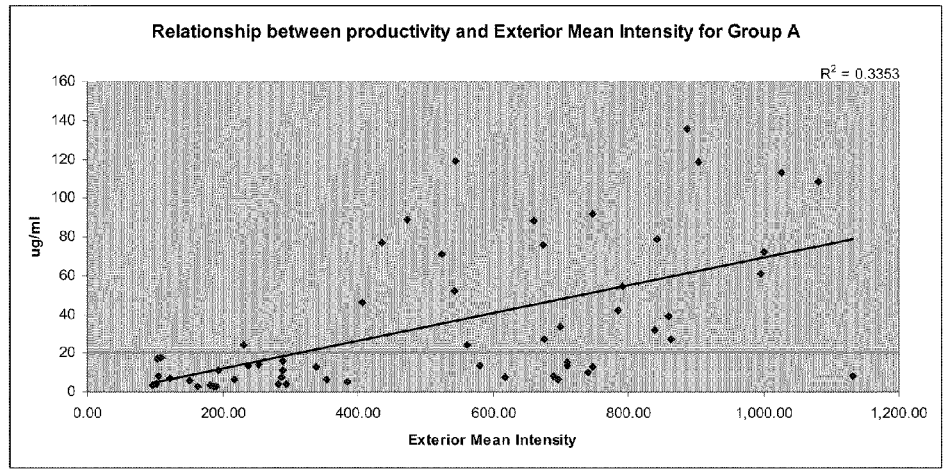
FIG. 15 shows productivity values for individual colonies plotted against exterior mean fluorescence intensity.

The productivity values for individual colonies in Group A were then plotted against exterior mean fluorescence intensity. There is a direct, proportional relationship between these two parameters, as shown in FIG. 15.

Figure 16:
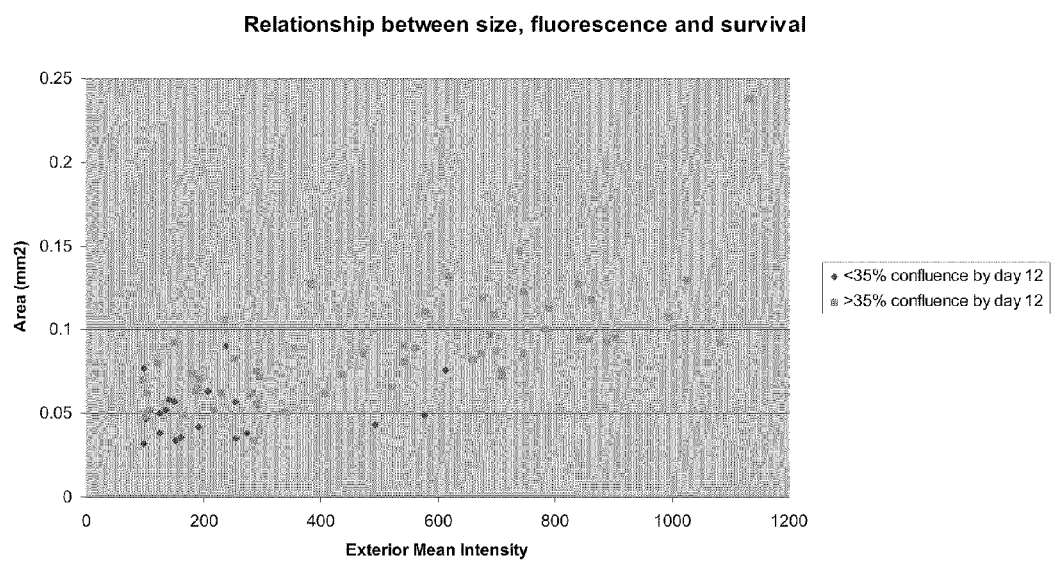
FIG. 16 shows the area of the colonies plotted against exterior mean fluorescence intensity.

Next the exterior mean fluorescence intensity was plotted against the area of the clones. The results are shown in FIG. 16, which shows that clones with an area below 0.05 mm$^2$ have a low chance of growing well at later stages of culture. Most of the colonies below this size value achieved less than 35% confluence by day 12.

In view of the above findings, the selection parameters were refined for the colonies of Group A. The fluorescence cut off value was increased from 90 to 400 U Exterior Mean Intensity to eliminate lower producers. A minimum size criterion of 0.05 mm$^2$ was applied to eliminate slow growing clones. A maximum size criterion of 0.2 mm$^2$ or 0.1 mm$^2$ was also used to eliminate fast growing low producers.

Figure 17:
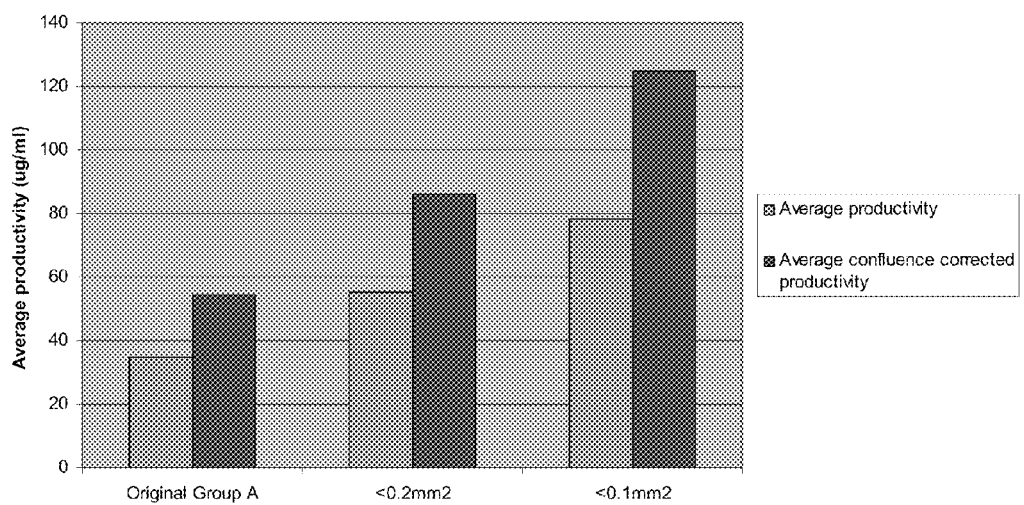
FIG. 17 shows average productivity (uncorrected or confluence corrected) of groups of colonies based on various selection criteria.

The results of applying these new selection criteria are shown in Table 2 below and in FIG. 17. Increasing the minimum fluorescence cut off and selecting clones from within a specific size range successfully reduces the population to those with the highest productivity values.

|  | n | Average productivity | Average confluence corrected productivity |
|---|---|---|---|
| Original Group A | 57 | 34.9 | 54.3 |
| <0.2 mm2 | 32 | 55.25 | 86.3 |
| <0.1 mm2 | 20 | 78.45 | 124.6 |

These results demonstrate that the present invention can be applied to efficiently select the highest value, most productive clones from a population. Using a clone which is even a percentage point higher in productivity can make an enormous cost difference on the industrial scale. The analytical methods described in this example can be implemented in an automated imaging and cell picking apparatus such as ClonePixFL to isolate clones with ideal characteristics—in this case size (growth) and secretion of the antibody product.

This experiment has clearly shown that by selecting high exterior fluorescence but refining the size to a narrow range, a population consisting only of high expressers can be isolated. The same process can be applied to identifying clones with internal or cell surface expression except a different fluorescence parameter may be used to identify these most successfully.

Figure 18:
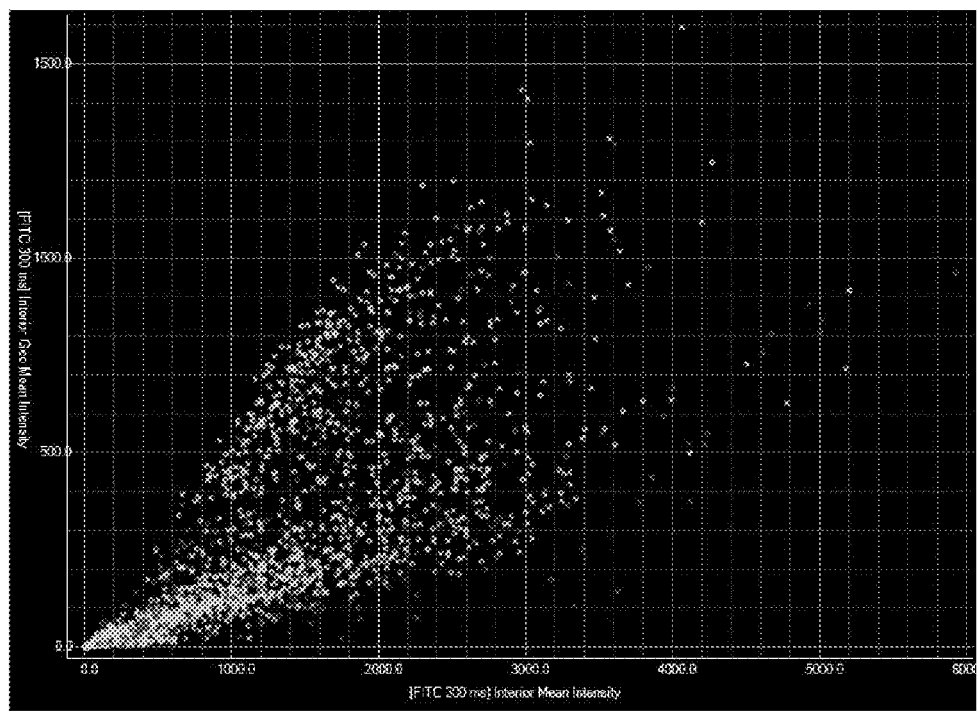
FIG. 18 shows interior geometric mean fluorescence intensity plotted against interior arithmetic mean fluorescence intensity for a plurality of cell colonies.

For instance, in an alternative embodiment, exterior geometric mean fluorescence intensity may be used to select productive clones instead of exterior (arithmetical) mean intensity. As shown in FIG. 18 (for the case of interior mean intensity values), geometric and arithmetic intensities do not necessarily correlate with one another, such that selecting colonies based on these two parameters may identify different colonies.

In embodiments of the present invention, the cells or cell colonies may be imaged over a period of time (e.g. over several minutes, hours or days) in order to repeatedly or continuously monitor the signal. This can be used to provide a quantitative indication of how production of the polypeptide of interest changes over time. This is an advantage over FACS (fluorescent-activated cell sorting) methods, which only enable cells to be classified or sorted at a single timepoint. Other advantages of the present methods over FACS-based methods include the ability to analyse cell size/morphology, the detection of secreted (as opposed to cell-associated) fluorescence, and minimal cell loss.

Although the protocol refers specifically to ClonePixFL as an example of a robotic apparatus, it will be clear to the skilled reader that any robotic apparatus capable of imaging colonies and picking selected ones may be used in the method. Such a robotic apparatus will generally comprise an imager for visualising colonies and enabling selection of colonies of interest (e.g., those colonies which show a high signal level) and a colony picker, to enable such colonies of interest to be picked. For example, a description of a robotic apparatus is provided in the section above "Robotic Detection and Picking"; with reference to that description, the colonies may be imaged using the imaging station 100, and picked using the cell-picking head 118.

The practice of the present invention will employ, unless otherwise indicated, conventional techniques of chemistry, molecular biology, microbiology, recombinant DNA and immunology, which are within the capabilities of a person of ordinary skill in the art. Such techniques are explained in the literature. See, for example, J. Sambrook, E. F. Fritsch, and T. Maniatis, 1989, *Molecular Cloning: A Laboratory Manual*, Second Edition, Books 1-3, Cold Spring Harbor Laboratory Press; Ausubel, F. M. et al. (1995 and periodic supplements; *Current Protocols in Molecular Biology*, ch. 9, 13, and 16, John Wiley & Sons, New York, N.Y.); B. Roe, J. Crabtree, and A. Kahn, 1996, *DNA Isolation and Sequencing: Essential Techniques*, John Wiley & Sons; J. M. Polak and James O'D. McGee, 1990, *In Situ Hybridization: Principles and Practice*; Oxford University Press; M. J. Gait (Editor), 1984, *Oligonucleotide Synthesis: A Practical Approach*, Irl Press; D. M. J. Lilley and J. E. Dahlberg, 1992, *Methods of Enzymology: DNA Structure Part A: Synthesis and Physical Analysis of DNA* Methods in Enzymology, Academic Press; Using Antibodies: A Laboratory Manual: Portable Protocol NO. I by Edward Harlow, David Lane, Ed Harlow (1999, Cold Spring Harbor Laboratory Press, ISBN 0-87969-544-7); Antibodies: A Laboratory Manual by Ed Harlow (Editor), David Lane (Editor) (1988, Cold Spring Harbor Laboratory Press, ISBN 0-87969-314-2), 1855, Lars-Inge Larsson "*Immunocytochemistry: Theory and Practice*", CRC Press inc., Boca Raton, Fla., 1988, ISBN 0-8493-6078-1, John D. Pound (ed); "*Immunochemical Protocols, vol 80*", in the series: "Methods in Molecular Biology", Humana Press, Totowa, N.J., 1998, ISBN 0-89603-493-3, Handbook of Drug Screening, edited by Ramakrishna Seethala, Prabhavathi B. Fernandes (2001, New York, N.Y., Marcel Dekker, ISBN 0-8247-0562-9); Lab Ref: A Handbook of Recipes, Reagents, and Other Reference Tools for Use at the Bench, Edited Jane Roskams and Linda Rodgers, 2002, Cold Spring Harbor Laboratory, ISBN 0-87969-630-3; and The Merck Manual of Diagnosis and Therapy (17th Edition, Beers, M. H., and Berkow, R, Eds, ISBN: 0911910107, John Wiley & Sons). Each of these general texts is herein incorporated by reference.

Each of the applications and patents mentioned in this document, and each document cited or referenced in each of the above applications and patents, including during the prosecution of each of the applications and patents ("application cited documents") and any manufacturer's instructions or catalogues for any products cited or mentioned in each of the applications and patents and in any of the application cited documents, are hereby incorporated herein by reference. Furthermore, all documents cited in this text, and all documents cited or referenced in documents cited in this text, and any manufacturer's instructions or catalogues for any products cited or mentioned in this text, are hereby incorporated herein by reference.

Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments and that many modifications and additions thereto may be made within the scope of the invention. Indeed, various modifications of the described modes for carrying out the invention which are obvious to those skilled in molecular biology or related fields are intended to be within the scope of the claims. Furthermore, various combinations of the features of the following dependent claims can be made with the features of the independent claims without departing from the scope of the present invention.

What is claimed is:

1. A method for determining a production level of a polypeptide of interest by a cell or cell colony, comprising:
    (a) obtaining, with an image-acquisition device, an image of one or more cells or cell colonies; and
    (b) analyzing the image with a data processor programmed to detect a signal associated with the polypeptide of interest;
    wherein a signal level is determined by the data processor for each cell or cell colony based on signal values from a predefined area surrounding and excluding the cell or cell colony in the image, the signal level being indicative of the production level of the polypeptide of interest by the cell or cell colony.

2. A method according to claim 1, wherein the predefined area comprises a circle centered on the cell or cell colony.

3. A method according to claim 2, wherein the circle has a diameter of 2-5 times a mean diameter of the cells or cell colonies.

4. A method according to claim 1, wherein the signal level comprises a mean of signal values in the predefined area.

5. A method according to claim 4, wherein the mean is an arithmetic mean or a geometric mean.

6. A method according to claim 1, wherein the signal level comprises a median of signal values in the predefined area.

7. A method according to claim 1, wherein the signal level comprises a sum of signal values in the predefined area.

8. A method according to claim 1, wherein the predefined area excludes one or more adjacent cells or cell colonies.

9. A method according to claim 1, wherein the signal level comprises a total exterior intensity value, the total exterior intensity value being calculated as a product of (i) a mean of signal values exterior to the cell or cell colony within the predefined area, excluding any signal values from pixels within adjacent cells or cell colonies; and (ii) a total number of pixels within the predefined area, including any pixels from within adjacent cells or cell colonies.

10. A method according to claim 1, wherein the polypeptide of interest is secreted by the cell or cell colony.

11. A method for selecting a cell or cell colony which produces a polypeptide of interest, comprising:
    (a) determining a production level of the polypeptide of interest by a plurality of cells or cell colonies by a method as defined in claim 1; and
    (b) selecting one or more cells or cell colonies which produce the polypeptide of interest at an elevated level.

12. A method according to claim 11, wherein cells or cell colonies having a signal level above a predetermined threshold value are selected.

13. A method according to claim 11, wherein cells or colonies having a size within a predetermined size range are selected.

14. A method according to claim 11, wherein the cells or cell colonies are selected based on a ratio of signal levels, each signal level being based on signal values at a particular wavelength.

15. A method according to claim 14, wherein cells or cell colonies having a signal ratio above a predetermined threshold value are selected.

16. A method according to claim 11, further comprising picking the selected cells or cell colonies.

17. A method according to claim 16, wherein the cell or cell colony is picked by an automated cell picking device.

18. A method according to claim 1, wherein the signal is a fluorescent signal.

19. A method according to claim 1, further comprising a step of contacting the cells or cell colonies with a marker compound before the step of obtaining an image of the cells or cell colonies.

20. A method according to claim 19, wherein the marker compound binds to the polypeptide of interest and provides the signal.

21. A method according to claim 19, wherein the marker compound comprises a fluorescent label.

22. A method according to claim 21, wherein the fluorescent label comprises fluorescein, rhodamine or phycoerythrin.

23. A method according to claim 1, further comprising detecting boundaries of the cells or cell colonies by imaging using visible light.

24. A method according to claim 1, wherein the polypeptide of interest comprises a biotherapeutic molecule.

25. A method according to claim 1, wherein the polypeptide of interest comprises an immunoglobulin or fragment thereof 26. A method according to claim 1, wherein the polypeptide of interest comprises a receptor.

27. A method according to claim 1 wherein the polypeptide of interest comprises a recombinant polypeptide expressed by a transfected cell.

28. A method according to claim 1, wherein the polypeptide of interest is a natural product of the cell.

29. A method according to claim 1, wherein the cells or cell colonies are cultured cells or cell colonies.

30. A method according to claim 1, wherein the image is obtained and analysed by an automated imaging system.

31. A method according to claim 1, wherein the cells or cell colonies are disposed on or in solid or semi-solid media.

32. A method according to claim 1, where each signal value corresponds to an intensity value from a single pixel in the image.

33. The method of claim 1, wherein the image is of a plurality of cells or cell colonies, and wherein the predefined area at least generally has the same basic dimensions for each cell or cell colony.

34. The method of claim 1, wherein the predefined area is substantially annular in shape.

35. A computer program, residing on a non-transitory computer-readable medium, for controlling automated image acquisition and analysis, the computer program comprising instructions for causing an apparatus to:
(a) obtain an image of one or more cells or cell colonies; and
(b) analyze the image to detect a signal associated with a polypeptide of interest, by determining a signal level for each cell or cell colony based on signal values from a predefined area surrounding and excluding the cell or cell colony in the image, the signal level being indicative of the production level of the polypeptide of interest by the cell or cell colony.

36. A computer program according to claim 35, further comprising instructions for causing the apparatus to pick one or more cells or cell colonies based on the indicated production level.

37. The method of claim 35, wherein the image is of a plurality of cells or cell colonies, and wherein the predefined area at least generally has the same basic dimensions for each cell or cell colony.

* * * * *